(12) United States Patent
Wuerfel

(10) Patent No.: US 10,018,459 B2
(45) Date of Patent: Jul. 10, 2018

(54) METHOD FOR THE LOCATION DETERMINATION OF THE INVOLUTES IN GEARS

(71) Applicant: Liebherr-Verzahntechnik GmbH, Kempten/Allgaeu (DE)

(72) Inventor: Robert Wuerfel, Kempten (DE)

(73) Assignee: Lienherr-Verzahntechnik GmbH, Kempten/Allgaeu (DE)

( * ) Notice: Subject to any disclaimer, the term of this patent is extended or adjusted under 35 U.S.C. 154(b) by 354 days.

(21) Appl. No.: 14/721,926

(22) Filed: May 26, 2015

(65) Prior Publication Data

US 2015/0338201 A1 Nov. 26, 2015

(30) Foreign Application Priority Data

May 23, 2014 (DE) .................... 10 2014 007 646
Apr. 23, 2015 (EP) ..................... 15164833

(51) Int. Cl.
*G01B 5/24* (2006.01)
*B23Q 17/20* (2006.01)
(Continued)

(52) U.S. Cl.
CPC .............. *G01B 5/24* (2013.01); *B23F 23/006* (2013.01); *B23F 23/12* (2013.01);
(Continued)

(58) Field of Classification Search
None
See application file for complete search history.

(56) References Cited

U.S. PATENT DOCUMENTS 3,765,303 A * 10/1973 Fischer .................. B23F 19/06
29/893.35
4,644,814 A * 2/1987 Rouverol ............ F16H 55/0806
74/457

(Continued)

FOREIGN PATENT DOCUMENTS

CN 101307813 A 11/2008
CN 101391322 A 3/2009
(Continued)

OTHER PUBLICATIONS

Russian Federal Service for Intellectual Property, Notice of Allowance Issued in Application No. 2015119233, dated Nov. 30, 2016, 15 pages. (Submitted with Partial Translation).
(Continued)

*Primary Examiner* — Ronald D Hartman, Jr.
(74) *Attorney, Agent, or Firm* — McCoy Russell LLP

(57) ABSTRACT

A method for the location determination of the involutes of a pre-gear cut workpiece within a gear-cutting machine using a gear-cut tool comprising the method steps: generating first and second relative movements between the workpiece and the tool; detecting respective, resulting first and second contact between a first tooth flank of the tool and a first tooth flank of the workpiece; and detecting a respective first and second set of coordinates for representing the relative movement of the workpiece and the tool; and determining the angles of rotation, the feeds, the axial distance and the crossed-axes angle of the tool and the workpiece based on the first and second set of coordinates and subsequent calculation of the location of the involutes on the basis of the angles of rotation, the feeds, the axial distance and the crossed-axes angle.

15 Claims, 9 Drawing Sheets

(51) Int. Cl.
*B23Q 17/22* (2006.01)
*G01B 5/008* (2006.01)
*B23F 23/12* (2006.01)
*G05B 19/414* (2006.01)
*B23F 23/00* (2006.01)

(52) U.S. Cl.
CPC .......... *B23F 23/1218* (2013.01); *B23Q 17/20* (2013.01); *B23Q 17/2241* (2013.01); *G01B 5/008* (2013.01); *G05B 19/4145* (2013.01); *G05B 2219/36198* (2013.01)

(56) References Cited

U.S. PATENT DOCUMENTS

| | | | | |
|---|---|---|---|---|
| 4,664,569 | A * | 5/1987 | Kotthaus | B23F 9/105 409/28 |
| 4,799,337 | A * | 1/1989 | Kotthaus | B23F 17/001 409/26 |
| 4,817,773 | A * | 4/1989 | Knodel | F16D 23/06 192/53.341 |
| 5,908,289 | A * | 6/1999 | Schwuchow | F04C 2/084 418/150 |
| 7,422,397 | B2 * | 9/2008 | Muller | B23F 9/10 409/26 |
| 7,748,131 | B2 | 7/2010 | Finkenwirth et al. | |
| 8,250,941 | B2 * | 8/2012 | Kurauchi | F16H 55/08 74/460 |
| 8,567,039 | B2 | 10/2013 | Neumaier et al. | |
| 8,932,105 | B2 * | 1/2015 | Heidelmann | B23F 1/02 451/47 |
| 9,346,105 | B2 * | 5/2016 | Mikoleizig | B23B 31/26 |
| 2005/0207858 | A1 * | 9/2005 | Muller | B23F 9/10 409/8 |
| 2009/0120227 | A1 * | 5/2009 | Kurauchi | F16H 55/08 74/462 |

FOREIGN PATENT DOCUMENTS

| | | |
|---|---|---|
| CN | 101733483 A | 6/2010 |
| CN | 102198543 A | 9/2011 |
| CN | 102596497 A | 7/2012 |
| DE | 38235 A | 5/1965 |
| DE | 286530 A5 | 1/1991 |
| DE | 19719249 C1 | 9/1998 |
| DE | 4330931 C2 | 10/2003 |
| DE | 102005022863 A1 | 11/2006 |
| DE | 102009008120 A1 | 8/2010 |
| DE | 102011077231 B3 | 10/2012 |
| DE | 102013003585 A1 | 9/2014 |
| SU | 378052 A1 | 9/1973 |
| SU | 891273 A1 | 12/1981 |
| SU | 1070424 A1 | 1/1984 |
| SU | 1147919 A1 | 3/1985 |

OTHER PUBLICATIONS

State Intellectual Property Office of the People's Republic of China, Office Action and Search Report Issued in Application No. 201510264355.6, dated Apr. 19, 2017, 16 pages.

* cited by examiner

METHOD FOR THE LOCATION DETERMINATION OF THE INVOLUTES IN GEARS

CROSS REFERENCE TO RELATED APPLICATIONS

This application claims priority to German Patent Application No. 10 2014 007 646.6, entitled "Method for the Location Determination of the Involutes in Gears", filed May 23, 2014, and also claims priority to European Patent Application No. 15 164 833.4 filed Apr. 23, 2015, entitled "Method for the Location Determination of the Involutes in Gears", which are hereby incorporated by reference in their entirety for all purposes.

TECHNICAL FIELD

The present disclosure relates to a method for the location determination of the involutes of a workpiece, preferably of a gear wheel having a conical and/or asymmetrical involute gear and to a method for the location-orientated production of a workpiece.

BACKGROUND AND SUMMARY

The determination of the location of the involutes is usually very uncomplicated with symmetrical spur gears. The position of the right flank and of the left flank is determined at a point and the path between these points is subsequently halved. This calculated point lies on the bisectrix at the center of the tooth gap. The purpose of this process is the determination of the optimum gap center.

There are different processes in accordance with the prior art for determining the tooth flank positions depending on whether the flank position is to be recognized contactlessly or by contact. In contact sensing processes, contact sensing devices are used or the tooth flank is contacted by the respective machining tool and the contact between the tool and the workpiece is determined via different recognition mechanisms.

There are various processes for convergence between the tool and the tooth flank depending on whether the tool is a disk-shaped or a worm-shaped tool. With disk-shaped tools, it is sufficient if, e.g. the workpiece is rotated for so long clockwise or counter clockwise until the contact between the tooth flank of the workpiece and the tool is established. Alternatively to this, the tool can be displaced in parallel with its axis.

With worm-shaped or gear-shaped tools, the tool is frequently rotated for so long until a contact is recognized. The workpiece can here also additionally be rotated or the tool can be displaced in parallel with its axis. Since the axes all have measurement systems, the axis positions on the contact between the workpiece and the tool can be determined exactly and the respective positions with respect to one another can be calculated.

It must be considered with worm-shaped tools whether the tool has a closed generating cut contour as with a grinding worm or whether it is, e.g., a hob in which only the tool edge has the contour relevant to the process. A contour deviating therefrom is then present between these two edges. If the contact is established at such a surface between the workpiece and the tool, the measured result can only be used with restrictions.

With conventional spur gear teeth in which the tooth flanks are symmetrical, this position determination is sufficient for normal machining operations. If in contrast the tooth flanks differ considerably between the right tooth flank and the left tooth flank and/or if the tooth flanks are also designed conically over the tooth width for this purpose, an averaging between two measurement points is no longer sufficient to describe the location of the involutes or an incorrect position may result from this.

This positioning is, however, necessary to be able to further machine pre-gear-cut workpieces. This is the case, on the one hand, when workpieces were pre-gear-cut in the soft state and now are also to be finished after a heat treatment in the hardened state as is the case, for example, with a gear-cutting grinding process and/or a gear-cutting honing process.

The shape of the deformations over the tooth width caused by the heat treatment process is frequently also relevant in addition to the location of the gear on the postmachining in the hardened state. In this case, the location of the gear has to be determined in a plurality of planes in relation to the tooth width. This is above all not very simple with very conical and/or asymmetrical gears.

In tooth grinding processes and tooth honing processes, an attempt is above all also made to keep the machining allowance as small as possible in the soft machining. It is additionally important here after the heat treatment also to determine the allowance distribution over the periphery of the gear in addition to the hard deformations so that too much material is not removed at some points of the gear and the tooth flank is subsequently soft again in these regions. This could result in transmission damage in the assembled transmission under working conditions and thus in a premature end of the transmission service life.

There are furthermore applications in which a second gear has to be machined or manufactured in dependence on a first gear. An exact knowledge of the location of the first gear is also absolutely necessary in this case.

A further application is the machining of rough-forged or sintered blanks. They are typically also postmachined to increase the gear accuracy. For this purpose, the position of the tooth gaps or of the teeth to be post-worked likewise has to be known with sufficient accuracy so that the machining allowance can be selected as low as possible in the premachining.

The object of the present disclosure deals with the further development of current measurement processes for the location determination of the involutes of a gear wheel so that they in particular also deliver sufficiently accurate measured results with gear wheels having an asymmetrical and/or conical flank shape.

This object is achieved by the method in accordance with the features of claim 1. Advantageous embodiments of the method are the subject of the subordinate claims dependent on the main claim.

In accordance with claim 1, a method is proposed for the location determination of the involutes of a pre-gear-cut workpiece within a gear cutting machine using a toothed tool.

The processes known from the prior art for the centering of gears are suitable for symmetrically toothed workpieces. As soon as a workpiece or tool having an asymmetrical or conical flank shape is used, such processes deliver erroneous results. A further developed method is therefore proposed in accordance with the present disclosure which takes account of the geometrical properties of asymmetrical and/or conical gears and calculates the location determination of the involutes based thereon.

In the method in accordance with the present disclosure, the tool and the workpiece form a helical rolling type gear transmission of two outer gears or of one outer gear and one inner gear. The workpiece and/or the tool can have both an asymmetrical cylindrical gear and a conical gear (beveloid gear). The workpiece is preferably a gear wheel having conical and/or asymmetrical spur gear teeth.

Possible manufacturing processes in which the method in accordance with the present disclosure for the location determination of the involutes can be used are, for example, gear grinding, hobbing, skiving hobbing, scraping, skiving and inside and outside honing, wherein both cylindrical and concical tools can be used in all these processes.

The method in accordance with the present disclosure admittedly primarily serves the location determination of the involutes in asymmetrical and/or conical gears, but the method can also easily be used with symmetrical cylindrical gears of the workpiece and/or of the tool. The subject matter of the present disclosure should therefore not be restricted to being carried out with asymmetrical cylindrical and/or conical gears.

It must furthermore be noted that the carrying out of the method steps in accordance with the present disclosure is based on an interaction between the tool and the workpiece. The location of the involutes can be determined both at the workpiece and alternatively at the tool using the method. For reasons of simplicity, only the location determination at the workpiece will be addressed in the following.

The core idea in accordance with the present disclosure is based on the interaction of the two gears. There is the also the possibility against this background to replace the workpiece or the tool with a so-called master wheel whose dimensions are known and which serves the location determination of the involutes of the gear wheel pair (workpiece or tool).

The method in accordance with the present disclosure comprises the following method steps:

a. Generating a first relative movement between the workpiece and the tool; detecting the resulting first contact between a first tooth flank, preferably the left tooth flank, of the tool and a first tooth flank, preferably the left tooth flank, of the workpiece; and detecting a first set of coordinates for representing the relative movement of the workpiece and the tool;

b. Generating a second relative movement between the workpiece and the tool; detecting the resulting second contact between a second tooth flank, preferably the right tooth flank, of the tool and a second tooth flank, preferably the right tooth flank, of the workpiece; and detecting a second set of coordinates for representing the relative movement of the workpiece and the tool;

c. Determining the angles of rotation, the feeds, the axial distance and the crossed-axes angle of the tool and the workpiece based on the first and second sets of coordinates; and calculating the location of the involutes on the basis of the angles of rotation, the feeds, the axial distance and the crossed-axes angle.

Different methods such as are already known from the prior art can be used for detecting the contact between two tooth flank pairs. For example, the recognition of a contact can take place by measuring at least one motor value of the actuator drives of the gear cutting machine. The motor current, the motor voltage, the motor torque, the motor speed or the effective motor power of one of the actuating drives of the gear-cutting machine have proven themselves as suitable motor values. The contact can be determined, for example, at the measured signal progression of at least one of the named motor values.

Which machine axis of the tool and/or of the workpiece generates the relative movement to achieve the contact between the two gears is of no significance for the carrying out of the method in accordance with the present disclosure. All available machine axes could theoretically be used together, only some of the available axes or only a single one. It is only essential for the carrying out of the method that the two gears of the workpiece and the tool are in contact at their involute surfaces.

Provided both gears mesh with one another, this contact can easily take place while the helical rolling type gear transmission rotates with roller coupling and the contact is achieved by opening the coupling with any desired axis suitable for this purpose.

The method in accordance with the present disclosure can, however, preferably also be carried out when the gears of the workpiece and the tool do not mesh with one another. In this case, a roller-coupled rotation of the transmission is only possible about a small angle since there is otherwise a risk of collisions with other teeth. The contact thus so-to-say has to take place at a standstill.

Position values for describing the relative location of the workpiece and tool at the moment of the contact can be determined with the aid of the recorded sets of coordinates for the contact of the left and right tooth flank pairs. The position values preferably form all degrees of freedom of the tool and workpiece clamped in the machine. The angle of rotation of the workpiece and the tool, the feed, for example the axial feed, of the workpiece and the tool, and their axial distance and their crossed-axes angle count as position values. These position values are determined both for the contact of the left tooth flank pair and the right tooth flank pair. With knowledge of these values, the location of the involute on the right tooth flank and on the left tooth flank can be calculated, i.e. the base gap half-angle for the right flank and for the left flank at a defined reference direction.

Only the sum of the two base gap half-angles of the left and right flanks is unambiguous for an asymmetrical gear. The values for the respective angles depend on the reference direction of the gap, which can be selected as desired, in a reference transverse section plane, which can be selected as desired.

It is a requirement for the direct calculation of the left and/or right base gap half-angle(s) that the locations of the left and right involutes of the tool are known.

It is a requirement for the direction calculation of the difference of the base gap half angle ($\Delta\eta_b$) that the difference of the base gap half-angles of the tool is known.

The relative location of the two gears with respect to one another can preferably be described on the basis of so-called kinematic chains from which the above-named position values result. Different kinematic chains exist depending on the gear type of the workpiece and/or of the tool. Such kinematic chains in particular form all six spatial degrees of freedom of the workpiece and/or of the tool.

Values which describe the location and position of the individual machine axes serve as the first and/or second set/sets of coordinates. Corresponding measurement values are stored after every contact. The physical machine axes of the gear-cutting machine are, however, not necessarily covered by the degrees of freedom of the kinematic chains. For the case that all the degrees of freedom cannot be mapped by machine axes, it is advantageous if the desired position values can be determined by equating the matching kinematic chain with a transformation of the detected machine coordinates. It is in particular conceivable in this connection that the angles of rotation, the feeds or the axial feeds, the axial distance and the crossed-axes angle are determined by equating a kinematic chain with the transformation of the recorded sets of coordinates.

It is a requirement for the direct calculation of the left and/or right base gap half-angle(s) that the locations of the left and right involutes of the gear wheel pair, i.e. of the tool, are known. The locations of the left and right involutes of the workpiece then have to be known for the converse case for the measurement of the tool.

It is sufficient for the calculation of the relative location of the left and right tooth flanks of the tool if the sum of the left and right base gap half-angles of the tool is known, i.e. if the tooth thickness of the tool teeth is known. This information is sufficient to calculate the sum of the base gap half-angles of the workpiece, i.e. the tooth thickness of the workpiece tooth.

There is the risk that the result of the location determination of the involutes is falsified when one or both of the gears of the workpiece or tool are modified. Such modifications can, for example, occur on the workpiece by the pre-gear-cutting process, by distortion due to hardening and/or by preceding machining steps/machining strokes with modified tools. They occur in tools, for example, due to wear defects or production defects and/or are deliberately placed into the tool to generate modifications directly on the workpiece. If these modifications are already known, they can be taken into account in the location determination of the involutes. The correction can be applied, for example, to both gears and to only one gear.

There is the possibility in an advantageous embodiment of the present disclosure that the calculated location of the involutes is used to center the tool for the following gear-cutting process with respect to the workpiece. This process was previously only possible in an automated manner for symmetrically cylindrical gears. The centering process can also be carried out in the gear-cutting machine fully automated on the basis of the method in accordance with the present disclosure with asymmetrical cylindrical and/or conical gears.

It is considered sufficient in the method in accordance with the present disclosure to contact exactly one left flank and one right flank. The location of the involutes can already be calculated directly after one measurement pass. To reduce effects due to measurement inaccuracies or profile deviations, it may be sensible to repeat the measurements with identical contact points and/or with different contact points, i.e. with different axial positions and/or at different tooth gaps/teeth/pitches of the tool and/or of the workpiece and to statistically evaluate the measured values to reduce measurement inaccuracies. Alternatively or additionally, the high number of measurement repeats can also be used for an allowance analysis and/or measurement of profile/flank and/or for a pitch measurement and/or a tooth thickness measurement.

The preceding allowance analysis can be considered for the centering, for example, to center the tool for the following gear-cutting machining such that the stock removal on the left flank and on the right flank of the workpiece is identical or almost identical in the normal direction. A stock removal ratio from the left and right flank sides of approximately 40 to 60% or less is considered approximately identical. It is moreover also possible to set the removal ratio from left and right directly as desired.

The method in accordance with the present disclosure can be used both for tools having an undefined edge, i.e. for workpieces in which the envelope gear corresponds to the geometry of the tool and for tools having a defined edge with an envelope gear differing from the geometry of the tool. An example for tools having an undefined edge is a grinding worm, for example, etc. In contrast, a hob represents a tool having a defined edge.

Hobs are therefore frequently premeasured externally to obtain information on where the tool edges lie relative to the hob periphery and to a reference surface at the tool mount. For the measuring procedure in accordance with the present disclosure, the hob can then be used in a positioned manner and a contact between the tool blade and the workpiece can be directly achieved for the location determination of the involutes. It therefore has to be ensured for the carrying out of the method that the contact points between the workpiece and the tool arise on the tool edge. This requirements is ensured, for example, in that movement axes of the tool and/or of the workpiece, preferably the angle of rotation and/or the feed of the tool and/or of the workpiece, are aligned in advance with knowledge of the location of one or more lands of the tool so that the contact point(s) between the workpiece and the tool lie(s) in the region of a defined edge, i.e. on the envelope gear of the tool.

The carrying out of the method can in particular be problematic in the location determination or in the centering of tools having narrow gears and unfavorable contact conditions. If, for example, one of the gears is so narrow that the theoretical distance of the contact points in the z direction is larger on the left and right flanks than the width of the tooth, the contact points on the left and right flanks on the narrow gears cannot arise on the involute. A contact with the edge of the gear takes place and a precise centering is no longer possible. It is proposed for this special case in the method in accordance with the present disclosure either to move more than one of the axes for the angle of rotation and the feed of the tool and/or tool between the contacts on the left and right flanks or to carry out a pivot movement in addition to one of these named axes to change the crossed-axes angle.

The method described in this present disclosure for determining the location of the involutes of a workpiece is not always carried out for every workpiece of one type prior to machining. It is typically carried out once or a few times for a workpiece of one type, in particular in mass production. An insertion sensor can then be taught with the result of this location determination in accordance with a preferred embodiment of the present disclosure. Such insertion sensors can generally not determine the absolute location of the workpiece, but rather only the location relative to a reference location, which makes such a teaching necessary. For this purpose, a workpiece whose location, i.e. the location of the involutes, is determined exactly using the method is preferably measured using an insertion sensor for this purpose and the current location is stored as a reference location. It is then possible with the aid of an insertion sensor taught in this way to bring all further workpieces into the same location or to determine their location relative to the reference location and thus also absolutely.

The present disclosure further relates to a method in accordance with claim 16 for the location-orientated production of a workpiece on a gear-cutting machine, wherein, starting from a separate desired default of the right and/or left base gap half-angle for the workpiece to be produced with respect to a reference direction, one or more desired values are determined for the angle(s) of rotation and/or for the feed(s) of the tool and/or of the workpiece and/or for the crossed-axes angle and/or the axial distance of the two gears. It is conceivable that the calculation provisions for calculating the base gap half-angle in accordance with the above-described method in accordance with the present disclosure for the determination of the location of the involutes are reversed in order to calculate corresponding adjustment movements for the gear-cutting machining starting from a predefined desired position of the involutes. For example, on the basis of predefined base gap half-angles for the desired involute shape of the workpiece, a corresponding desired value for the angle(s) of rotation of the tool/workpiece and/or the feed(s) of the tool/workpiece can be calculated. A corresponding actuation of the machine axes then results in the desired involute shape of the workpiece during the gear-cutting movement.

The reference direction for the base gap half angle can preferably be determined by measurement with a measuring sensor. The calculation of the desired value(s) for the angle(s) of rotation, the feed(s), the axial distance and/or the crossed-axes angle ideally takes place using kinematic chains which describe the relative location between the workpiece and the tool.

The method in accordance with the present disclosure for the location-orientated production can preferably also be carried out combined with the method for the location determination of the involutes.

In addition to the method in accordance with the present disclosure, the present disclosure additionally relates to a gear-cutting machine having a CNC control, wherein the CNC control has corresponding program regulations for carrying out the method in accordance with the present disclosure for the location determination of the involutes and/or the method in accordance with the present disclosure for the location-orientated production or an advantageous embodiment of these methods in accordance with the present disclosure. The gear-cutting machine additionally comprises suitable machine axes for carrying out the required relative movement between the workpiece and the tool as well as corresponding sensors or corresponding detection means to be able to determine the axial changes precisely and to be able to detect the moment of the contact between the workpiece and the tool.

The advantages and properties of the gear-cutting machine in accordance with the present disclosure obviously correspond to those of the corresponding methods in accordance with the present disclosure so that a repeat description will be dispensed with at this point.

Further advantages and properties of the present disclosure will be explained in more detail in the following with reference to a plurality of Figure representations.

BRIEF DESCRIPTION OF THE FIGURES

FIG. 1 shows a schematic representation of the gear to be measured with base gap half-angles drawn in.

DETAILED DESCRIPTION

Figure 1:
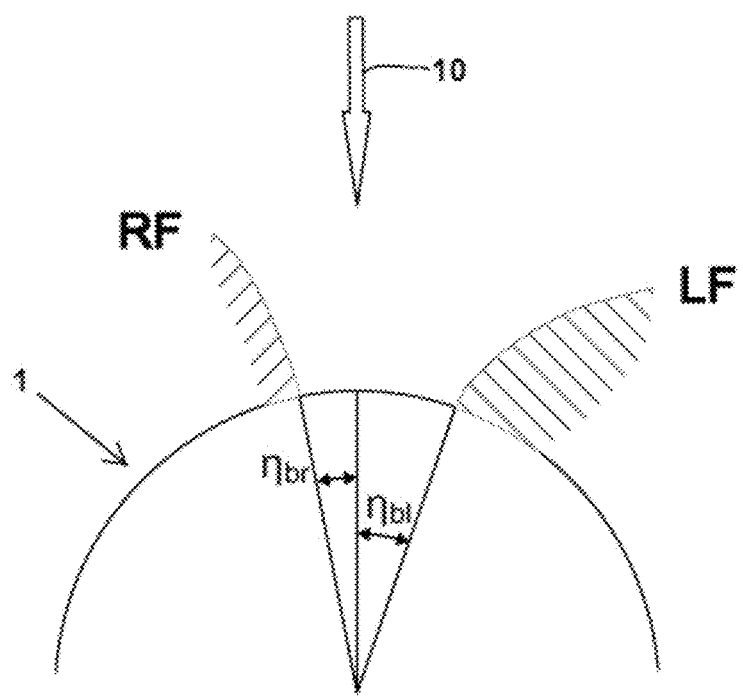

The method in accordance with the present disclosure for the measurement of a gear wheel will be described in detail in the following. The geometrical properties of asymmetrical and/or conical gears are in particular considered in the method in accordance with the present disclosure. The taking into account of these properties in conjunction with a defined calculation provision allows the calculation of the location of the involutes on the left and right tooth flanks of a gear wheel to be measured. The method can moreover be used for a simple allowance determination of a workpiece using a tool, a location-dependent machining of gears and for centering gears and tools.

In the method in accordance with the present disclosure, the tool and the workpiece form a helical rolling type gear transmission of two outer gears or of one outer gear and one inner gear. The workpiece and/or the tool can have both an asymmetrical cylindrical gear and a conical gear (beveloid gear). The workpiece is preferably a gear wheel having a conical and/or asymmetrical involute gear.

Possible manufacturing processes in which the method in accordance with the present disclosure for the location determination of the involutes can be used are, for example, gear grinding, hobbing, skiving hobbing, scraping, skiving and inside and outside honing.

The method is suitable for carrying out on a CNC gear-cutting machine which provides the required machine axes for carrying out the relative movements between the clamped workpiece and the received tool. At the same time, the processing machine has corresponding sensors for measuring the axial positions and for storing corresponding coordinates.

The mathematical relationships for the method performance will first be looked at in more detail.

General:

All values which differ for the left and right flanks of a gear wheel are provided with the index F. The index F can in this respect adopt the value 1 for the left tooth flank and the value r for the right tooth flank. Equations which contain the values with the index F apply equally to both flanks.

Possible involute gears are divided into the following four classes, where $r_b$ is the radius of the base circular cylinder of the gear wheel and $\beta_b$ is the base helical angle of the involute. The properties of these involute types can be described by the following equations.

Type 1: Conventional cylindrical symmetrical gears $$r_b = r_{br} = r_{bl} \text{ and}$$

$$\beta_b = \beta_{br} = \beta_{bl}$$

Type 2: Cylindrical asymmetrical gears $$r_{br} \neq r_{bl} \text{ and } \frac{\tan\beta_{br}}{r_{br}} = \frac{\tan\beta_{bl}}{r_{bl}}$$

Type 3: Symmetrical beveloids, i.e. they can be generated using a symmetrical tool $\beta_{br} \neq \beta_{bl}$ and $\cos\beta_{br} \cdot r_{br} = \cos\beta_{bl} \cdot r_{bl}$ Type 4: Asymmetrical beveloids, i.e. they can only be generated using an asymmetrical tool $\beta_{br} \neq \beta_{bl}$ and $\cos\beta_{br} \cdot r_{br} \neq \cos\beta_{bl} \cdot r_{bl}$ and $\dfrac{\tan\beta_{br}}{r_{br}} \neq \dfrac{\tan\beta_{bl}}{r_{bl}}$ The following terms are used for the transformations in the following:

$R_x(\phi)$: rotation about the angle $\phi$ about the x axis. Analog for y and z $T_x(v)$: translation by the path v in the x direction. Analog for y and z $H(A_1 \ldots A_N)$: general transformation can be described by a homogeneous matrix having a total of N coordinates $A_1$ to $A_N$.

The term "coordinates" is used here for generalized coordinates which are not necessarily independent. In the simplest case, these coordinates correspond to the positions of translatory or rotary axes and the transformation is given by a kinematic chain composed of translations and rotations.

The axis of rotation of a gear always coincides with the z axis in its rest frame. Due to the asymmetry of the gears described here, different generalized base gap half-angles $\eta_{bl}$ and $\eta_{br}$ are introduced for the left and right flanks LF, RF (see FIG. 1). Only the sum $\Sigma\eta_b := \eta_{bl}+\eta_{br}$ is unambiguous for a given gear 1. The orientation of gear teeth, i.e. the alignment of the gaps or of the teeth is clearly given by the difference $\Delta\eta_b := \eta_{bl}-\eta_{br}$. The values for $\eta_{bl}$ and $\eta_{br}$ depend on the reference direction 10 of the gap which can be selected as desired. The center can be selected with symmetrical gears and in this case: $\eta_{bl}=\eta_{br}$. For beveloid gears, $\Sigma\eta_b$, $\eta_{bl}$ and $\eta_{br}$ relate to a reference transverse sectional plane. With cylindrical gears, these values are in contrast the same in all transverse sectional planes.

The tooth thickness is used synonymously here for the values measurement over balls, tooth width, $\Sigma\eta_b$ or another test dimension. All these values can be directly converted into one another. In a w-b diagram, properties of a flank are applied over the rolling path w and the z position b.

To determine the relative position of the two gear wheels, i.e. of the tool and of the workpiece with respect to one another, the following kinematic chains are defined which take account of the respective involute type of the tool and of the workpiece. For reasons of simplicity, only the gears 1 and 2 will be addressed in the following, with the gear 1 representing either the workpiece or the tool and the gear 2 being the corresponding counter-wheel, i.e. the tool or the workpiece.

Kinematic Chain with Two Cylindrical Gears 1 and 2:

The relative position of the two gears 1, 2 is described by the following kinematic chain $K_R$:

$K_R := R_z(-\phi_1) \cdot T_z(-z_{V1}) \cdot T_y(d) \cdot R_y(\gamma) \cdot T_z(z_{V2}) \cdot R_z(\phi_2)$ where $\phi_1$ is the angle of rotation of the gear wheel 1, $\phi_2$ is the angle of rotation of the gear wheel 2, $z_{V1}$ is the axial feed of the gear wheel 1, $z_{V2}$ the axial feed of the gear wheel 2, d the axial distance and $\gamma$ the crossed-axes angle.

Kinematic Chain with One Conical Gear 1 and One Cylindrical Gear 2:

The relative position of the two gears 1, 2 is described by the following kinematic chain $K_R$:

$K_R := R_z(-\phi_1) \cdot T_y(r_{w1}) \cdot R_x(\vartheta_1) \cdot T_z(-z_{V1}) \cdot T_y(d) \cdot R_y(\gamma) \cdot T_z(z_{V2}) \cdot R_z(\phi_2)$ where $\phi_1$ describes the angle of rotation of the gear 1, $\phi_2$ the angle of rotation of the gear wheel 2, $z_{V1}$ the feed of the gear 1, $z_{V2}$ the axial feed of the gear wheel 2, d the dimension for the axial distance, $\gamma$ the crossed-axes angle, $\vartheta_1$ the cone angle of the gear wheel 1 and $r_{w1}$ the rolling circle radius of gear wheel 1.

Kinematic Chain with Two Conical Gears 1 and 2:

The relative position of the two gears 1, 2 is described by the following kinematic chain $K_R$:

$K_R := R_z(-\phi_1) \cdot T_y(r_{w1}) \cdot R_x(\vartheta_1) \cdot T_z(-z_{V1}) \cdot T_y(d) \cdot R_y(\gamma) \cdot T_z(z_{V2}) \cdot R_x(-\vartheta_2) \cdot T_y(-r_{w2}) \cdot R_z(\phi_2)$ where $\phi_1$ describes the angle of rotation of the gear 1, $\phi_2$ the angle of rotation of the gear wheel 2, $z_{V1}$ the feed of the gear 1, $z_{V2}$ the feed of the gear wheel 2, d the dimension for the axial distance, $\gamma$ the crossed-axes angle, $\vartheta_1$ the cone angle of the gear wheel 1. $\vartheta_2$ the cone angle of the gear wheel 2, $r_{w1}$ the rolling circle radius of gear wheel 1 and $r_{w2}$ of gear wheel 2.

Since the axial distance of the two axes of rotation varies with the feed if at least one of the two gears is conical, in this case d is here only called a measure for the axial distance. The actual axial distance for given feeds $z_{V1}$ and $z_{V2}$ can be calculated directly from the kinematic chains. In the further course, however, this measure for the axial distance axis is also called the axial distance.

The feeds $z_{V1}$ and $z_{V2}$ do not extend in the axial direction with conical gears, but rather tilted by the respective cone angle with respect to this direction. They are here therefore called the feed and not, as with cylindrical wheels, the axial feed. In the further course, however, the term feed is also used for cylindrical wheels.

Figure 8:
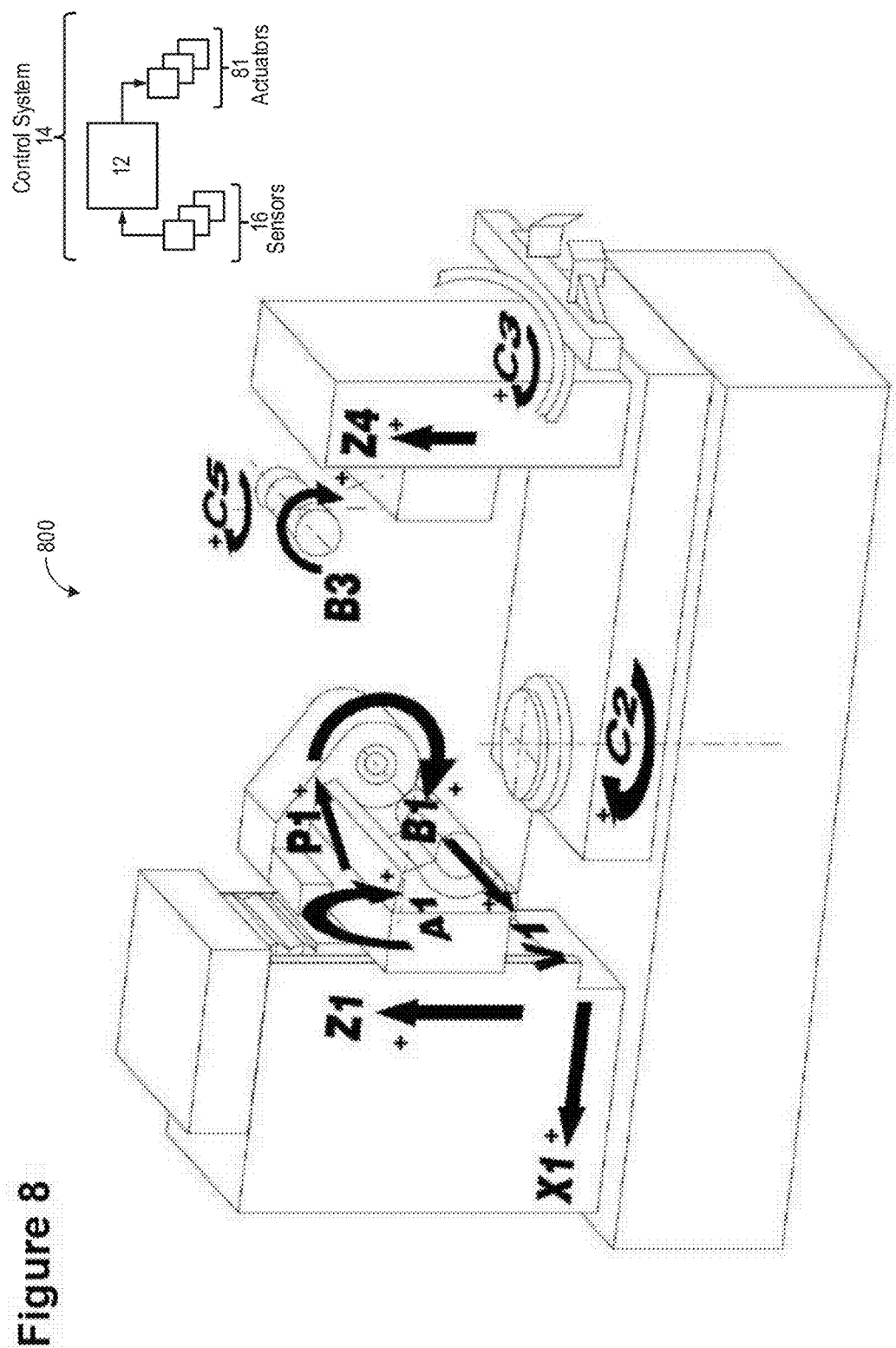
FIG. 8 shows by way of example, schematically a gear-cutting machine for using the method.

Coordinate Transformation:

These kinematic chains map all six spatial degrees of freedom. They do not have to coincide with the physical axes of the processing machine on which the method in accordance with the present disclosure is used. If the machine has a movement apparatus which allows relative positions of the two wheels 1, 2 in accordance with a transformation $H(A_1 \ldots A_N)$ mit $N \geq 1$ the coordinates $\phi_1 \phi_2 z_{V1} z_{V2}$, d and $\gamma$ can be determined from the coordinates $A_1 \ldots A_N$ by equating $K_R = H(A_1 \ldots A_N)$ A reversal of this transformation is also necessary at some points in this present disclosure, i.e. the coordinates $A_1 \ldots A_N$ have to be calculated from the values $\phi_1$, $\phi_2$, $z_{V1}$, $z_{V2}$, d and $\gamma$. The methods mentioned in this connection are only possible on a machine having a given movement apparatus if this reverse calculation is possible for the values $\phi_1$, $\phi_2$, $z_{V1}$, $z_{V2}$, d and $\gamma$ determined for the special case. This reverse calculation does not necessarily have to result in an unambiguous solution for $A_1 \ldots A_N$. Typical movement apparatus which allow the reverse calculation for all values $\phi_1$, $\phi_2$, $z_{V1}$, $z_{V2}$, d and $\gamma$ are described, for example, by the following kinematic chains:

$H_{Bsp1} = R_z(\phi_{B1}) \cdot T_z(-v_{V1}) \cdot R_x(90°-\phi_{A1}) \cdot T_z(-v_{Z1}) \cdot T_x(-v_{X1}) \cdot R_z(\phi_{C2})$ $H_{Bsp2} = R_z(\phi_{B1}) \cdot R_x(90°-\phi_{A1}) \cdot T_z(-v_{Y1}) \cdot T_z(-v_{Z1}) \cdot T_x(-v_{X1}) \cdot R_z(\phi_{C2})$ FIG. 8 schematically shows a gear-cutting machine 800 with a movement apparatus described by $H_{Bsp1}$. The gear-cutting machine 800 includes a control system 14. Control system 14 includes a controller 12 (e.g., electronic controller). Controller 12 may be a microcomputer, including a microprocessor unit, input/output ports, an electronic storage medium for executable programs and calibration values, random access memory, keep alive memory, and a data bus. Further, the controller 12 may include a non-transitory, computer-readable storage medium (e.g., memory). The controller 12 is shown receiving information (e.g., signals and input data) from a plurality of sensors 16 (various examples of which are described herein) and sending control signals to a plurality of actuators 81 (various examples of which are described herein). As one example, sensors 16 may include an insertion sensor, measuring sensor, and other sensors as described herein. Other sensors such as additional measurement sensors for determining the involute locations may be coupled to various locations in the gear-cutting machine 800. As another example, the actuators may include various actuator drives and a measurement tool of the gear-cutting machine 800. Thus, the controller receives signals and input data from the various sensors, process the input data, and employs the various actuators of FIG. 8 to operate the machine based on the received signals, processed input data, and instructions stored on a memory of the controller. Example control routines executed by the controller 12 are described herein with regard to FIGS. 9 and 10. Further, the controller 12 may execute the methods and control routines described herein using the actuators and sensors of the gear-cutting machine in combination with the instructions stored on the controller memory. As an example, the controller may include computer-readable instructions stored thereon for determining the locations of involutes and/or for the location-oriented production of a workpiece. In one embodiment, the controller is a CNC control, where the CNC control has corresponding program regulations for carrying out the method in accordance with the present disclosure for the location determination of the involutes and/or the method in accordance with the present disclosure for the location-orientated production or an advantageous embodiment of these methods in accordance with the present disclosure. The gear-cutting machine additionally comprises suitable machine axes for carrying out the required relative movement between the workpiece and the received tool as well as corresponding sensors or corresponding detection means to be able to determine the axial changes precisely and to be able to detect the moment of the contact between the workpiece and the tool. After measuring the axial positions, the machine may then store the corresponding coordinates in a memory of the controller 12.

The following relationships are now defined for the location determination of the involutes:

Cylindrical involute gears 1 and 2 are observed which do not necessarily have to mesh with one another. Two gears mesh with one another when, and only when:

$$m_{bF1} \cdot \cos \beta_{bF1} = m_{bF2} \cdot \cos \beta_{bF2}$$

It is of no importance here whether the gears are conical or cylindrical. Both a left flank of the workpiece and a left flank of the tool and subsequently a right flank of the workpiece and a right flank of the tool are brought into contact for the location determination. For this purpose, the movement apparatus is traveled and the contact is detected using one of the known processes. A recognition of the contact can be made, for example, with reference to the measurement of the torque of the respective axial drive.

On both contacts, a set of coordinates $A_{F1} \ldots A_{FN}$ is respectively recorded and a respective set of coordinates $\phi_{F1}$, $\phi_{F2}$, $z_{VF1}$, $z_{VF2}$, $d_F$ and $\gamma_F$ is calculated from it in accordance with the above equations.

Alternatively, here and in the further course, the order of the measurements can be reversed so that first the right flanks and subsequently the left flanks are brought into contact.

A huge advantage of the method in accordance with the present disclosure is that which axes are traveled how to achieve the contact is of no importance. All axes can theoretically be used together or only one axis alone. In the current centering known from the prior art, only one of the axes $\phi_1$ or $\phi_2$ or $z_{V1}$ or $z_{V2}$ was previously traveled. It is only decisive that the two gars contact at the involute surfaces. This flexibility can, for example, be of advantage, on the one hand, when the physical axles of the movement apparatus do not correspond to the kinematic chain defined here and thus a traveling of one of the coordinates $\phi_1$ or $\phi_2$ or $z_{V1}$ or $z_{V2}$ requires traveling of a plurality of physical axles. Such a traveling of a plurality of axes as a rule produces a greater imprecision and should be avoided where possible. In particular when at least one of the gears is conical, the just described case of the non-coinciding kinematic chains is frequently present. A further advantage is to predefine the contact points on one or on both gears. This can be utilized both in the allowance analysis and/or in the flank and profile measurement and for avoiding contacts of the two gears on non-involute regions, for example on edges of the gears.

If both toothed arrangements mesh with one another, the contact can take place while the helical rolling type gear transmission rotates with roller coupling and the contact can be achieved by opening the coupling with any desired axis suitable for this purpose.

In the event that both gears do not mesh with one another, a roller-coupled rotating of the transmission is only possible about small angles since there would otherwise be collisions with other teeth. The contact thus so-to-say has to take place at a standstill.

The most important relation for most of the calculations listed here results from the calculation of the condition which has to be satisfied when two left flanks or two right flanks of two involute gears contact in a helical rolling type gear transmission. The flanks of a cylindrical or conical involute gear can be described by the following parameterization:

$$E(w, b) = \begin{pmatrix} r_{bF} \cdot \sin\left(s_F \cdot \left(\frac{w}{r_{bF}} + \eta_{bF}\right) - \frac{b \cdot \tan(\beta_{b,F})}{r_{bF}}\right) - s_F \cdot w \cdot \cos\left(s_F \cdot \left(\frac{w}{r_{bF}} + \eta_{bF}\right) - \frac{b \cdot \tan(\beta_{bF})}{r_{bF}}\right) \\ r_{bF} \cdot \cos\left(s_F \cdot \left(\frac{w}{r_{bF}} + \eta_{bF}\right) - \frac{b \cdot \tan(\beta_{bF})}{r_{bF}}\right) + s_F \cdot w \cdot \sin\left(s_F \cdot \left(\frac{w}{r_{bF}} + \eta_{bF}\right) - \frac{b \cdot \tan(\beta_{bF})}{r_{bF}}\right) \\ b \end{pmatrix}$$

w here parameterizes the tooth in the profile direction and b in the flank line direction.

$s_F$ serves to write equations for left and right flanks in a compact form and is defined by:

$$s_F := \begin{cases} +1, & \text{for left flanks} \\ -1, & \text{for right flanks} \end{cases}$$

The relation sought here is obtained in that the contact of two left flanks or two right flanks is respectively calculated in the same reference system. The rest frame of the gear 1 can be selected for this purpose, for example. The flank of the gear 1 is given directly by the above-indicated parameterization in this reference system. To describe the flank of the gear 2 in this reference system, the above-indicated parameterization first has to be transformed into this system with the aid of the transformation given by the previously defined kinematic chain $K_R$.

An alternative calculation approach will be shown in the following with which the contacts can be calculated. This calculation of the contact between the workpiece and the tool is carried out with the aid of two theoretical racks 60, 61 (also called basic racks), one each for the workpiece and the tool, each with trapezoidal, generally asymmetrical profiles, which can generate the gear teeth. Since both the tool and the workpiece are involute gear teeth, this observation is symmetrical on a swapping over of the tool and the workpiece.

Figure 6:
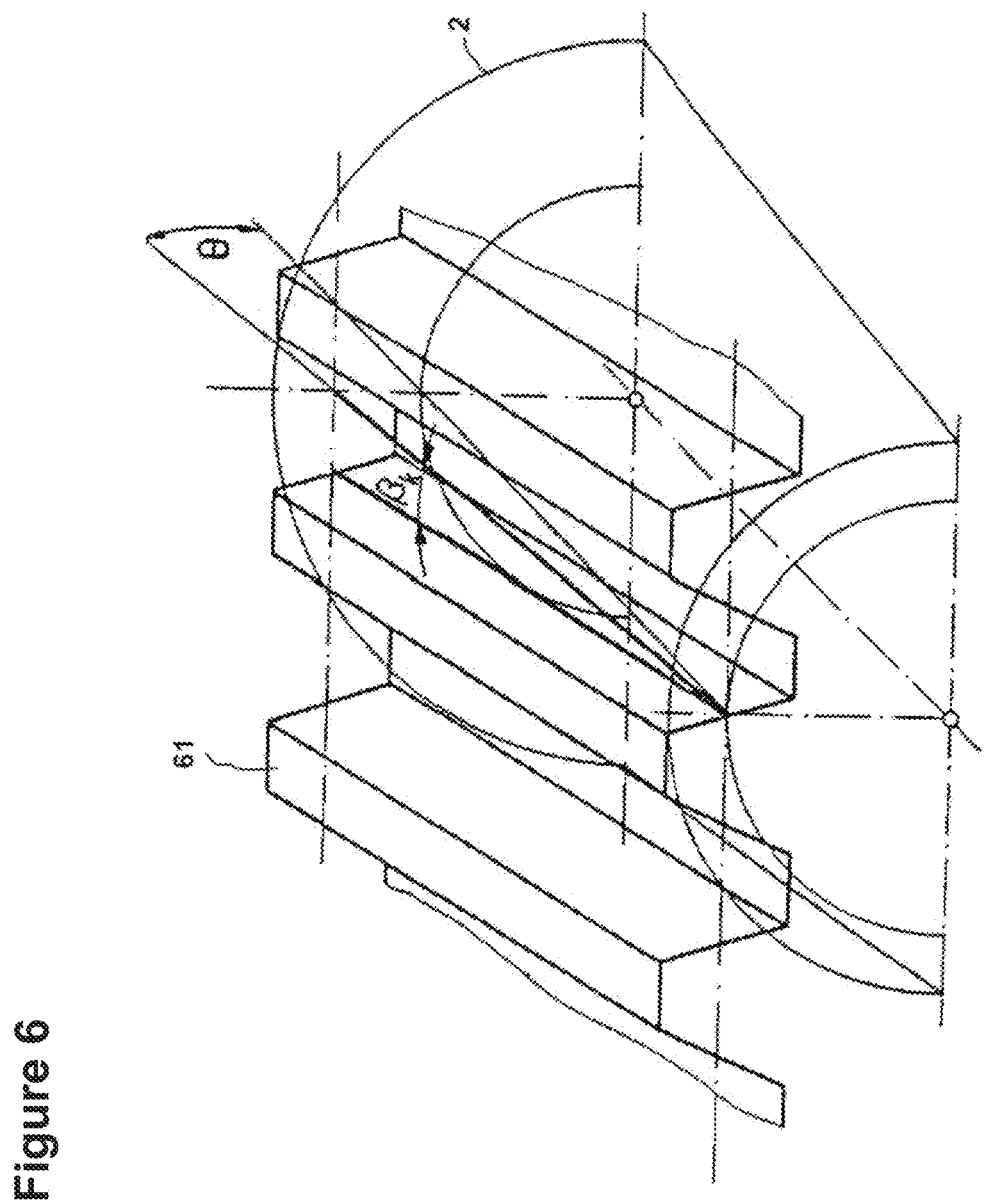
FIG. 6 shows a representation of a conical gear with a rack generating it.
Figure 7:
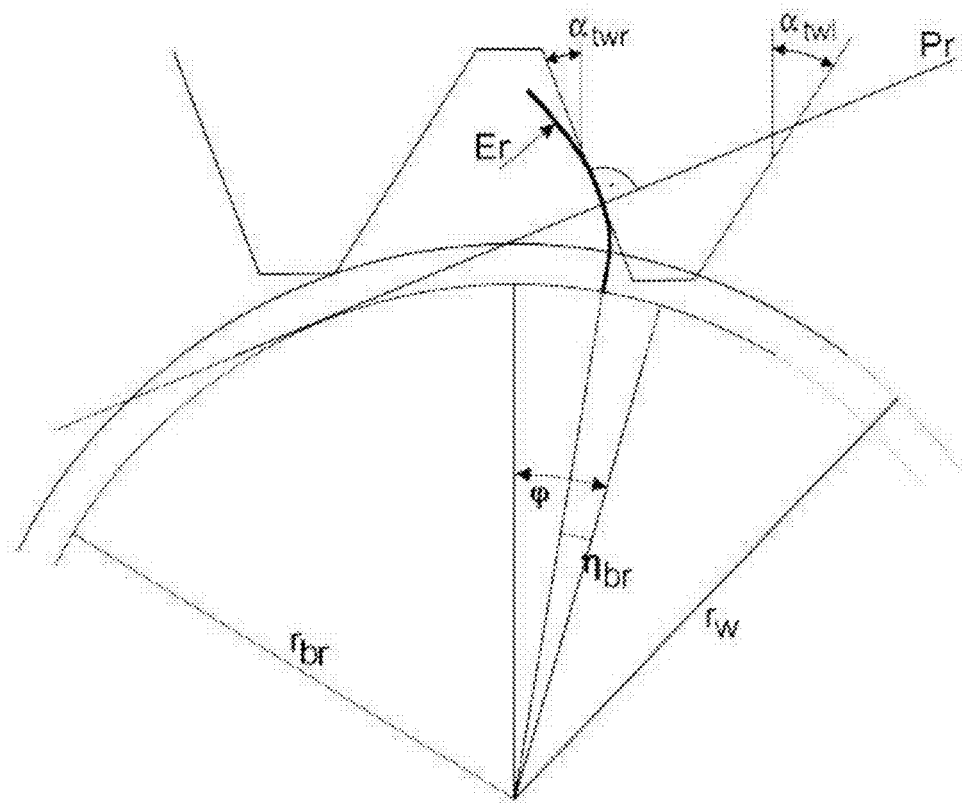
FIG. 7 shows a representation of a right involute flank and of the rack generating it.

FIG. 7 shows by way of example the contact of a right involute flank $E_r$ with a generating rack with a profile angle $\alpha_{twr}$ in a transverse section. The gear teeth are rotated by the angle of rotation $\varphi$. The contact between the flank and the rack takes place in the plane of engagement $P_r$ which is inclined by $\alpha_{twr}$. The contact point between the flank and the rack results for all angles of rotation $\varphi$ as the intersection between the flank and the plane of engagement. Whereas the gear teeth rotate, the rack is displaced horizontally so that it rolls off without slipping on the rolling circle having a radius $r_w$. The flank and the rack thereby remain in contact. To describe the gear teeth in their total width, the relative location of the rack with respect to the gear teeth must be looked at in 3D. For cylindrical gear teeth, it is pivoted by the helical angle $\beta_w$. For the case of conical gear teeth, the location of the rack for the gear cutting is described in detail in [Zierau] (The geometrical design of conical gears and pairings with parallel axes, Report No 32, Institute for Construction Science, Braunschweig Technical University). In addition to the pivoting about the helical angle $\beta_w$, a tilt takes place by the conical angle $\vartheta$ (see FIG. 6). In both cases, the rack has the profile angle $\alpha_{nwF}$ in the normal section. Which combinations of angles $\alpha_{twF}$, $\alpha_{nwF}$ and $\beta_w$ and of the normal module $m_n$ and the front module $m_t$ are possible to produce given gear teeth, results from the set of formulae of DIN 3960 for cylindrical gear teeth and additionally from the set of formulae of [Zierau] for conical gear teeth. The formulae required for this purpose can be transferred directly to asymmetrical gear teeth by introducing different profile angles on the left and right sides.

If the geometry and relative location of the rack 60, 61 with respect to the gear 1, 2 are known, the transverse sections can be determined for any desired width positions and in them the point of contact between the rack and the flank. All these contact points in the individual transverse sections form a straight line (contact straight line) B1, B2 in the plane of engagement P1, P2 for an angle of rotation $\varphi$. If these points of contact are described through w and b from the parameterization in equation [Eq Inv], a linear relationship (R1) is obtained between w, b and $\varphi$. If the rack is held tight in space, it is possible for cylindrical gears to displace them in the axial direction. This axial feed $z_V$ is typically set for the workpiece to machine it over the whole gear-cut width and is set for the tool to set which part of the tool has contact with the workpiece. So that the gear teeth still contact the rack with one or two flanks, the gear teeth have to be rotated about their axis in addition to their displacement. The amount of the rotation results from the pitch height of the gear teeth and the amount of the displacement; the sense of rotation results from the pitch direction. With conical gear teeth, the feed $z_V$ does not take place in the axial direction, but is rather tilted by the conical angle $\vartheta$ with respect to it in accordance with the same formula as for cylindrical gear teeth from $\beta_w$ and $m_t$. For calculating the points of contact in the individual transverse sections, the transverse sections are to considered in dependence on the axial feed or on the feed with the correspondingly corrected angles of rotation. A linear relationship (R2) between w, b, $z_V$ and $\varphi$ results from (R1) for the description of the contact points.

Figure 5:
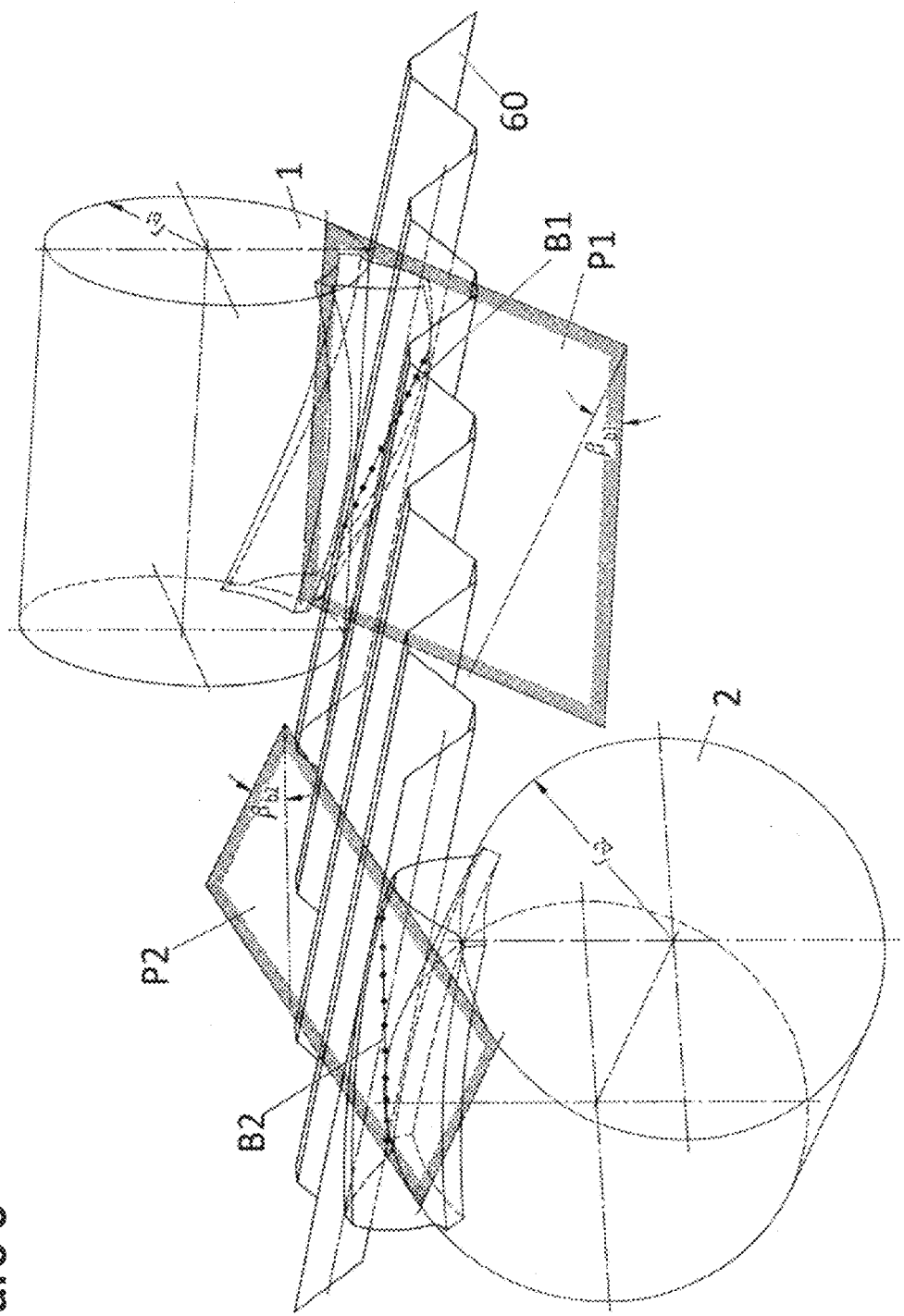
FIG. 5 shows a representation of two gears in a helical rolling type gear transmission.

If two gears are paired in a helical rolling type gear transmission, their two racks 60, 61 must be flush at all times, as shown in FIG. 5. This implies that the profile angle $\alpha_{nwF}$ has to be the same for both gears. It furthermore results therefrom (R3): $\gamma + \beta_{w1} + \beta_{w2} = 0$. This condition makes it possible to determine the profile angles in the normal section or in the transverse section of the two racks from a given crossed-axis angle for two given gears which can mesh with one another. A change of the base circle radii and of the base helical angles of the worm is thus equivalent to a change of the profile angle and/or of the conical angle and/or of the crossed-axis angle.

Reference is made to the two Figure representations of FIGS. 5 and 6 for illustration.

FIG. 5 here shows a representation of two gears 1, 2 in a helical rolling type gear transmission, including the common toothed rack 60 and the resulting engagement planes P1, P2 or contact lines B1, B2 of the gears 1, 2 with the toothed rack 60. For better illustration, the relative position of the two gears 1, 2, does not correspond to that in the helical rolling type gear transmission. FIG. 5 also shows the relative position of a cylindrical gear with respect to the generated toothed rack. FIG. 6 represents a conical gear 1 with a toothed rack 61 generating it.

So that the racks are flush at all times, a linear compulsory condition (R4) results between the two angles of rotation and the two feeds.

If the two angles of rotation and the two feeds are known, the point of contact of the two gears can be determined directly by calculating the point of intersection of the two straight contact lines B1, B2. The parameters $b_{F1}$ and $w_{F1}$ or $b_{F2}$ and $w_{F2}$, which describe the point of contact to gear 1 or gear 2 depend linearly on $\varphi_1, \varphi_2, z_{V1}$ and $z_{V2}$ (R5). If the angles of rotation are eliminated in these relationships, the sought contact paths (R6) result.

A linear relationship (R7) results from (R4) and (R2) for both gears by an elimination of $\varphi_1$ and $\varphi_2$ between $w_{F1}, w_{F2}, z_{v1}$ and $z_{V2}$ which describes in dependence on the feed which roller path on gear 1 contacts which roller path on teeth 2.

It must be noted that on a change of the crossed-axes angle, both the profile angles of the toothed racks 60. 61 and the helical angles between the axes of rotation of the gears 1, 2 and the toothed racks 60, 61 vary. With conical gears, the cone angle additionally varies, whereby the transformation varies which is defined by the kinematic chain. If a clearance-free transmission of two gears meshing with one another is observed, both toothed racks have the same modulus and both the left flanks and the right flanks of teeth in mutual engagement each lie in identical planes. This is the case, for example, on a two-flank machining. There is generally no clearance-free transmission in the location determination, i.e. only left flanks or only right flanks of teeth in mutual engagement lie in an identical plane. If the location of non-meshing wheels is determined, the two toothed racks generally neither have the same profile angle in the normal section in each case on the left flank or right flank nor do they have the same modulus.

If a crossed-axes angle $\gamma_F$ is preset which is to be set on the contact of two left flanks and of two right flanks, the calculation of the contact results deom (R4) such that a contact takes place when and only when the following relation is satisfied:

$$a_{F1}+b_{F1}\cdot z_{VF1}+c_{F1}\cdot\eta_{bF1}+d_{F1}\cdot\phi_{F1}+a_{F2}+b_{F2}\cdot z_{VF2}+c_{F2}\cdot\eta_{bF2}+d_{F2}\cdot\phi_{F2}+e_F\cdot d_F=0 \quad [\text{EQ\_Rel}]$$

Where the coefficients $$a_{F1}, a_{F2}, e_F \quad [\text{EQ\_Coeff}]$$

are dependent both on the basic parameters of the gears and on $\gamma_F$ and, with conical gears, on the cone angle, whereas the coefficients $$c_{F1}, d_{F1}, c_{F2}, d_{F2} \quad [\text{EQ\_Const}]$$

are only dependent on the basic parameters of the gears.
The coefficients $$b_{F1}, b_{F2} \quad [\text{EQ\_Const2}]$$

are only dependent on the basic parameters with cylindrical gears; with conical gears the corresponding coefficient is additionally dependent on $\gamma_F$ and on the corresponding cone angle.

The basic parameters here mean the basic circle radii, the basic helical angles and the numbers of teeth/helices ($z_1$ and $z_2$).

Using the two sets of coordinates calculated from the recorded sets of coordinates, the base gap half-angles $\eta_{bl1}$ and $\eta_{br1}$ can be calculated directly with a given $\gamma_F$ and optionally the cone angles from the two equations ([EQ_Rel]) for the left and right flanks, so that the exact location of the involutes would be determined. The requirement for this is the knowledge of $\eta_{bl2}$ and $\eta_{br2}$, i.e. the locations of the left and right involutes of gear 2.

The following symmetries apply with symmetrical cylindrical and symmetrical conical gears:

$$c_{l1}=-c_{r1},$$

$$d_{l1}=d_{r1}$$

$$c_{l2}=-c_{r2},$$

$$d_{l2}=d_{r2} \quad [\text{EQ\_Sym\_cyl\_con}]$$

The following symmetries additionally apply with symmetrical cylindrical gears:

$$e_l=-e_r, \text{ if } \gamma_l=\gamma_r$$

$$a_{l1}=-a_{r1}, \text{ if } \gamma_l=\gamma_r$$

$$b_{l1}=b_{r1}$$

$$a_{l2}=-a_{r2}, \text{ if } \gamma_l=\gamma_r$$

$$b_{l2}=b_{r2} \quad [\text{EQ\_Sym\_cyl}]$$

If the two wheels mesh with one another, equation ([EQ_Rel]) can be written with different coefficients, here provided with an overline, which have the same dependencies on $\gamma_F$, the basic parameters and optionally the cone angles, as was stated above for the parameters without overline, but—independently of the type of the gears and whether they are symmetrical—have the following symmetries:

$$\frac{\overline{c}_{F1}}{\overline{c}_{F2}} = \frac{z_1}{z_2}$$

$$\frac{\overline{d}_{F1}}{\overline{d}_{F2}} = \frac{z_1}{z_2}$$

$$\overline{b}_{l1} = \overline{b}_{r1}$$

$$\overline{b}_{l2} = \overline{b}_{r2}$$

$$\overline{c}_{l1} = -\overline{c}_{r1}$$

$$\overline{c}_{l2} = -\overline{c}_{r2}$$

$$\overline{d}_{l1} = \overline{d}_{r1}$$

$$\overline{d}_{l2} = \overline{d}_{r2} \quad [\text{EQ\_mesh}]$$

$$\overline{a}_{F1} + \overline{b}_{F1}\cdot z_{VF1} + \overline{c}_{F1}\cdot\eta_{bF1} + \overline{d}_{F1}\cdot\phi_{F1} + \overline{a}_{F2} + \overline{b}_{F2}\cdot z_{VF2} + \overline{c}_{F2}\cdot\eta_{bF2} + \overline{d}_{F2}\cdot\phi_{F2} + \overline{e}_F\cdot d_F = 0 \quad [\text{EQ\_Rel2}]$$

With the relationships from equation ([EQ_mesh]), it follows from equation ([EQ_Rel2]) that $\Sigma\eta_{b1} := \eta_{bl1}+\eta_{br1}$ and thus the tooth thickness can be determined solely with knowledge of $\Sigma\eta_{b2} := \eta_{bl2}+\eta_{br2}$ and of two sets of coordinates, one each for the left and for the right flank. Consequently, the locations of the left and right involutes ($\eta_{bl2}$, $\eta_{br2}$) of gear 2 do not have to be known for the tooth thickness determination with meshing gears. It is sufficient only to know the tooth thickness of the gear 2. Analogously, $\Delta\eta_{b1} := \eta_{bl1}-\eta_{br1}$ and thus the location of the teeth or of the gaps can be determined solely with the knowledge of $\Delta\eta_{b2} := \eta_{bl2}-\eta_{br2}$ and of two coordinate sets. Consequently only the orientation of the teeth or gaps of the gear 2 has to be known for the determination of the location of the teeth or gaps at the gear 1 with meshing gears.

The above-mentioned approach for calculating a contact of two involutes can also be utilized to calculate the points on both flanks on both gear which contact on a given relative location, defined b the coordinates $\gamma$, d, $z_{V1}$, $z_{V2}$, $\phi_1$ and $\phi_2$ if a contact is actually taking place. It is utilized in this respect that the contact of both gears with their toothed rack in each case extends along a straight line and these straight lines extend in a common plane, from which exactly one point of intersection result. This point of intersection, which lies on both toothed racks, corresponds just to the contact point of the two gears. The contact point on the toothed rack can then be converted into a point on the gear, defined by b and w.

This conversion can be derived via the generation of an involute gear having a trapezoidal profile. The exact location of the straight lines on the toothed racks for a given angle of rotation results from the fact that the contact of the toothed rack with the gear has to lie in the engagement plane. This plane lies tangentially at the base circle and stands perpendicular on the profile of the toothed rack.

The following relationships are thus obtained:

$$b_{F1} = C_{b0F1} + C_{b\phi F1} \cdot \phi_{F1} + C_{bz_{V1}F1} \cdot z_{VF1} + C_{bz_{V2}F1} \cdot z_{VF2}$$

$$w_{F1} = C_{w0F1} + C_{w\phi F1} \cdot \phi_{F1} + C_{wz_{V1}F1} \cdot z_{VF1} + C_{wz_{V2}F1} \cdot z_{VF2}$$

$$b_{F2} = C_{b0F2} + C_{b\phi F2} \cdot \phi_{F2} + C_{bz_{V1}F1} \cdot z_{VF2} + C_{bz_{V2}F2} \cdot z_{VF2}$$

$$w_{F2} = C_{w0F2} + C_{w\phi F2} \cdot \phi_{F2} + C_{wz_{V1}F2} \cdot z_{VF1} + C_{wz_{V2}F2} \cdot z_{VF2} \quad [\text{EQ\_Cal}]$$

The coefficients $C_{bz_{V2}F1}$ and $C_{wz_{V2}F1}$ or $C_{bz_{V1}F2}$ and $C_{wz_{V1}F2}$ only differ from zero when gear 1 or gear 2 is conical. If this is the case, they depend on the basic parameters, the corresponding cone angle and $\gamma_F$. The coefficients $C_{b0F1}$, $C_{w0F1}$, $C_{b0F2}$ and $C_{w0F2}$ additionally depend on $d_F$.

The coefficients $C_{b\phi F1}$, $C_{w\phi F1}$, $C_{b\phi F2}$ and $C_{w\phi F2}$ only depend on the basic parameters.

The relationship from equation [EQ_Cal] can also be used conversely to determine a relative location of the two gears with respect to one another at which the contact takes place at predefined point on one or on both gears. For this purpose, $w_{F1}$ and/or $b_{F1}$ and/or $w_{F2}$ and/or $b_{F2}$ are predefined and coordinates $\gamma_F$, $d_F$, $z_{VF1}$, $z_{VF2}$, $\phi_{F1}$ and $\phi_{F2}$ are calculated therefrom so that the equations [EQ_Cal] are satisfied.

In the following, possible optional extensions of the method in accordance with the present disclosure or possible applications of the method will be illustrated.

Taking Modifications into Account:

The determination of the location of the involutes is falsified when one or both of the gears 1, 2 are modified. These modifications can arise on the workpiece by the pre-gear-cutting process, by distortion due to hardening and/or by preceding machining steps/machining strokes with modified tools and/or modified machining kinematics. In the first and last cases, they are known as a rule; in the second case they can possibly be acquired from experience or from measurements. With tools, they are known on the basis of the design or from the measurement of the tool when the modifications are unwanted differences due to wear or production defects. These modifications falsify the determination of the location of the involutes to a certain degree. If the modifications are known, however, they can be taken into account in the location determination.

Figure 2:
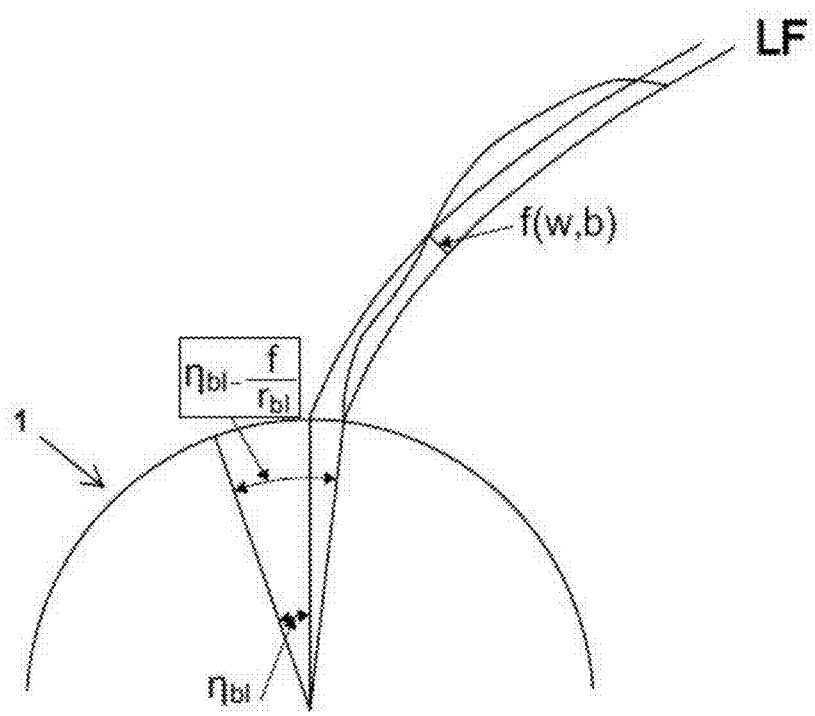
FIG. 2 shows the representation in accordance with FIG. 1 with a modified involute.

Modifications are typically described in transverse sections and are defined therein perpendicular to the involute. They are called $f_F(w,b)$ here, where w is the roller path and b defines the z position of the transverse sectional plane. A sufficiently good approximation of the measured $\eta_{bF}$ and that corrected by $f_F$ is obtained when the $\eta_{bF}$ is corrected by the summand $-f_F(w,b)/r_{bF}$ in equation ([EQ_Rel]) (see FIG. 2).

This correction can be applied both to both gears 1, 2 and to only one. w and b are here the roller angle and the transverse section (defined by the z position) at which both gears contact. With large modifications, the result, in particular the location of the measured modification, can be refined in that w is corrected by the summand $f_F(w,b)$. If a gear was pre-cut with the same profile modifications with which it is further cut, a taking into account of the corrections is not necessary if the tool is at full immersion depth since in this case the profile modifications interact exactly with one another and thus compensate one another again. To be able to have immersion which is free of collision and is as deep as possible, $\gamma$ can be varied in dependence on the design of the tool.

Motivation of Location Determination/Centering of Non-Meshing Wheels:

In small production runs, it is possible that no suitable tools are present for the pre-gear cutting and the wheels thus have to be pre-gear cut with incorrect tools. This problem is amplified with asymmetrical gears since the probability of having a suitable tool is possibly even smaller due to the different profile angles on the left and right flanks since both profile angles have to match. Wheels gear-cut with an incorrect tool as a rule have incorrect base circle radii and incorrect base helical angles. The pitch height which is purely determined by the manufacturing kinematics can in contrast also be correctly generated with incorrect tools.

As a rule, however, despite the incorrect, but known tool with known manufacturing kinematics, the exact geometry, in particular the base circle radii and the base helical angles of the pre-gear cut wheel can be determined. This knowledge can be used to determine the locations of the pre-gear cut involutes correctly using the methods described here on the further gear-cutting and to center correctly. However, it must be taken into account in this case for the calculation of the correct centering position that the desired flank and the actual flank do not only differ in their locations, as is the case with correctly pre-gear cut workpieces, but rather also differ in their shape due to the different base circle radii and/or base helical angles. The desired location is preferably to be determined such that a minimum allowance is not fallen below along both flanks and/or a maximum allowance is not exceeded.

If the wheel is incorrectly pre-gear cut and if the geometry is not known, the macrogeometry, in particular the base circle radii and the base helical angles can first be determined approximately by a profile measurement and/or flank measurement. A further application is the location-orientated production, wherein the gear to be machined is to be aligned at another gear which does not have to mesh with the tool.

Multiple Measurement/Tolerance Analysis/Profile/Flank Measurement:

In the method described here, it is sufficient in theory to contact exactly one left flank and one right flank. The location of the involutes can be directly calculated therefrom. To reduce effects due to measurement inaccuracies or profile differences, it may be sensible to repeat the measurements at the same point or at different points, that is with different contact points and thus different axial positions, and/or at different gaps/teeth/pitches of the tool and/or of the workpiece and to statistically evaluate the measured values.

Multiple measurements $i = 1 \ldots N$ with different contact points can, however, also be used to determine the modifications or the allowance. The modification or the allowance at a contact point given by $w[i]$ and $b[i]$ is in a sufficient approximation $$f_F(w[i], b[i]) = (\eta_{b0F1} - \eta_{bF1[i]}) \cdot r_{bF},$$

where $\eta_{b0F1}$ describes the location of the reference involute. This can be determined as with conventional gear measurement, for example so that all modifications are positive. To measure the modification at a point of the workpiece given by w and b (here marked by index 1), $\phi_1$, $z_{V1}$, d and $\gamma$ have to be set so that the contacts on the workpiece take place just at the desired points. A further point which has to be observed here is the covering of the helical rolling type gear transmission. This is larger than 1 as a rule, which has the result that generally a plurality of left flanks or a plurality of right flanks simultaneously have contact at all times. This has the consequence that it is no longer possible to distinguish at which of these points the contact took place and which point was thus measured. The contacts which take place on different teeth moreover also take place at different z positions, both on the tool (here marked by the index 2) and on the workpiece. This circumstance can be utilized to avoid the problem just described. For this purpose, $z_{V2}$ is set and the tool is thus traveled so that the z position at which the point lies on the tool which contacts the desired point on the workpiece still lies on the tool, but the z positions of the points on the tool which would theoretically also be simultaneously in engagement no longer lie on the tool. It is thus ensured that there is only contact at one point and the measurement can be unambiguously associated with one point on the workpiece. This ultimately has the result that the contact takes place in proximity to the ends of the tool in the axial direction.

Location-Orientated Production:

If the involutes of a gear are aligned at a reference direction 10 (FIG. 1) in production, this is the same as having the separate predefinition of $\eta_{bl1}$ and $\eta_{br1}$ of the produced gear. γ and d are first calculated for the production process using the tooth thickness of the tool and the desired tooth thickness of the workpiece. The coefficients can be calculated therefrom as in equation [EQ_Coeff].

The angle of rotation of the other gear can be determined from equation [EQ_Rel] for one of the two flanks with a given angle of rotation of a gear and with feeds ($z_{V1}$ and $z_{V2}$) of both gears so that $\eta_{b1}$ is achieved on this flank. The calculation for the other flank is to be carried out analogously for single-flank machining. With two-flank machining, the other $r_{ibs}$ results automatically when the tooth thickness of the tool, d and γ were previously correctly coordinated with one another. Alternatively, one of the feeds can be calculated in the same manner or up to four of the parameters $\phi_1$, $\phi_2$, $z_{V1}$, $z_{V2}$ can be determined so that [EQ_Rel] is satisfied. Since the tool and the workpiece mesh with one another in production, equation ([EQ_Rel2]) can alternatively be used for the calculation.

A common variant of defining the location of the involutes is the presetting of the location of the centre of a tooth or of a gap in a defined transvere section plane on a defined radius. Such a location is defined purely by $\Delta\eta_b$ independently of the tooth thickness. A knowledge of $\eta_{b1}$ and $\eta_{br}$ is thus not necessary. It is thus also sufficient to know only the orientation of the teeth of the tool which orientation can likewise be described, for example, through the position of the center of a tooth or of a gap. The indication of a radius for a definition of the location of the center is necessary when the gear has an asymmetrical transverse section ($r_{b1} \neq r_{br}$) since in this case the center does not lie at the same angle position on all radii.

Use on Tools with a Defined Edge:

With tools with a non-defined edge (e.g. worm), the method can be used when both wheels rotate in a transmission. In this case, both wheel have contact permanently, but also when the transmission is not rotating and the two wheels so-to-say touch at standstill. With tools with a defined edge (e.g. a hob or skiving wheel), the geometry of the tools does not correspond to the envelope gear which theoretically produces the workpiece (due to chip flutes and the relief grinding of the edges or cutting plates which have been placed on).

The envelope gear can be both cylindrical and conical. For example, on skiving with cylindrical tools, the envelope gear is a beveloid wheel i.e. the manufacturing kinematics corresponds to a helical rolling type gear transmission with a conical tool and a cylindrical or conical workpiece. With conical tools, the envelope gear is cylindrical as a rule, but can also be conical, depending on the manufacturing kinematics. The common points of the tool and its envelope gear are the points on the cutting edges. All other points on the tool lie within (and not on) the envelope gear.

Figure 3:
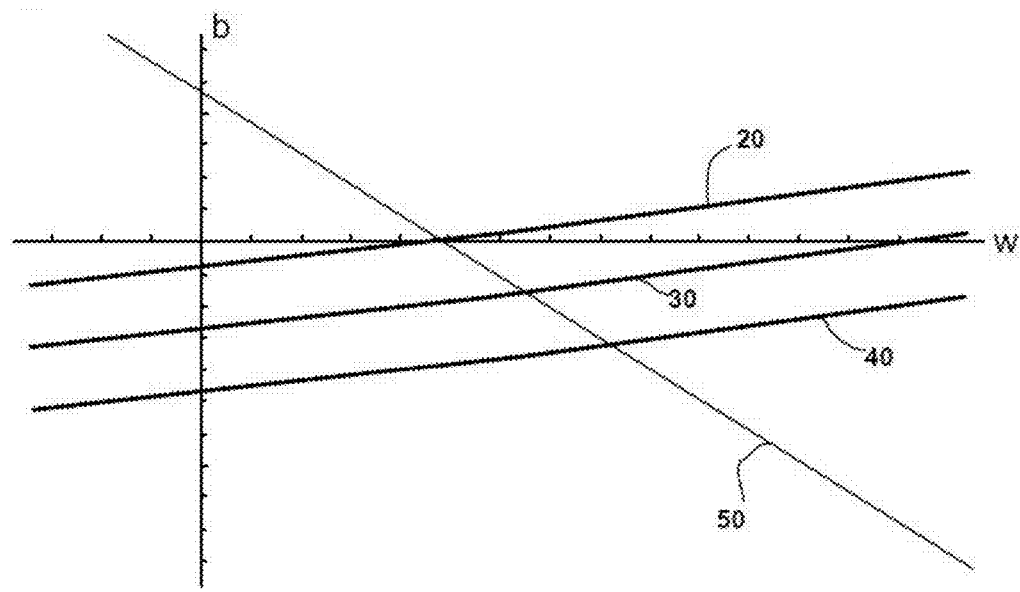
FIG. 3 shows a w-b diagram for illustrating the cutting edges of a tool having a defined cutting edge.

FIG. 3 shows a w-b diagram in which the properties of a flank are entered over the roller path w and the z position b. FIG. 3 in particular shows the cutting edges of three lands 20, 30, 40 in a w-b diagram of the envelope gear. In addition, the extent of the contact point 50 on the envelope gear with the workpiece is drawn in. Only when the tool contacts the workpiece at one of the points of intersection of these lines can the method described here be used reliably and in an unchanged manner on tools with a defined edge in a quasi-standstill. If the contact takes place at a different point, the result is falsified since the contact no longer takes place on, but within the envelope gear. There are two solution possibilities to remedy this problem.

With knowledge of the exact location of the lands 20, 30, 40 on the tool, the relative location can be selected with the aid of the equations [EQ_Cal] before the contact so that the contact with the counter-wheel takes place exactly on one of the points of intersection and thus on the envelope gear. The method can then be used without modification.

If it is not possible or is not wanted that the tool is correspondingly rotated, it can be calculated with knowledge of the location of the lands 20, 30, 40 on the tool how much the contact point differs from a point of intersection and it can thus be calculated where it lies within the envelope gear and a correction value can be calculated from this which corrects the difference in comparison with a contact on the envelope gear. The method can thus be used for non-meshing wheels for tools with a defined edge.

With tools whose geometry only agrees with the envelope gear over part surfaces, as with scraping wheels, for example, an analog procedure as with tools with a defined edge can be followed. The contact point in this case has to lie on that part of the tool which coincides with the envelope gear.

Advantage of Non-Rotating Transmissions:

In addition to the advantage that the wheels do not have to mesh with one another, it can be of advantage that the contact can be very "gentle" and thus neither of the two wheels is damaged. If the contact is established with a rotating transmission, friction, abrasion and wear always occur.

Figure 4:
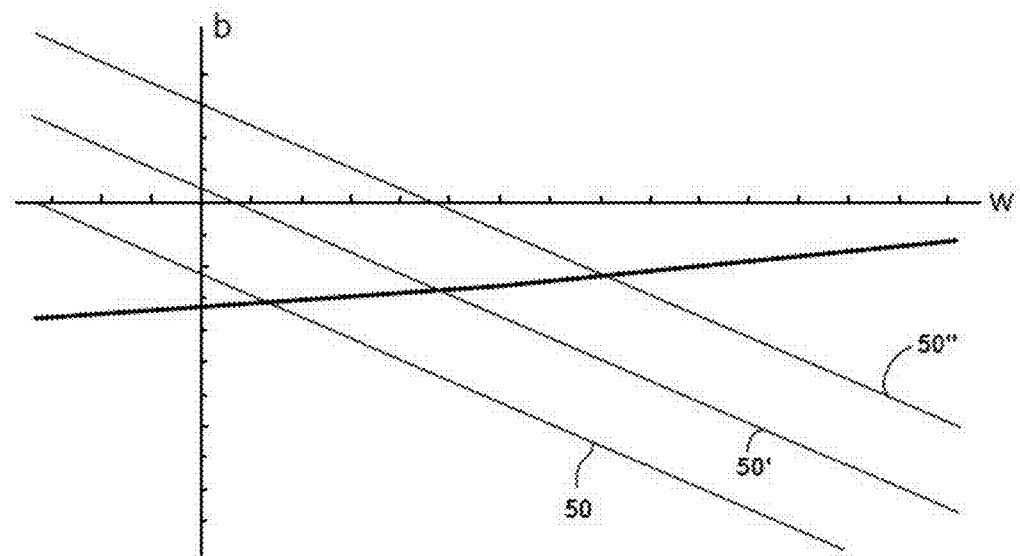
FIG. 4 shows the w-b diagram of FIG. 3 with a displaced contact line.

Measuring a Tool:

The method can also be used conversely and a tool can be measured using a measuring gear. All typical values of a gear measurement can be determined such as profile, flank, pitch, tooth thickness. The above-mentioned points must be observed with tools with a defined edge. The contact line 50, 50' 50" can be displaced in the b direction by varying the feed of the tool to be measured, whereby the point of intersection thereof with the cutting edge can be displaced in the profile direction. A measurement of the cutting edge thereby becomes possible over the whole profile (see FIG. 4). As with the above-described measurement of a workpiece, the problem results here of the multiple contact due to the coverage. The solution takes place here analogously by a suitable traveling of the gear.

Removal-Optimized Centering:

If an allowance analysis of the workpiece to be machined has been carried out, a location of the involutes of the fully gear-cut wheel can be determined which is ideal under technological aspects by using said analysis. If this location is determined, production can be carried out with location orientation with respect thereto.

If the allowance is assumed as constant over the total flank, the location of the involutes can be determined so that the removal $f_{nF}$ in the normal direction is the same on left and right flanks. It may be sufficient under certain circumstances that the removal at the left and at the right is not exactly the same, but rather lies in the range of 40% to 60%, with the ranges naturally being able to approximate one another as desired. In certain cases, it can also be desirable to distribute the removal differently directly over the two flanks. This can be sensible, for example, when different wear occurs at the left and right flanks at the tool. With such an asymmetrical removal distribution, a flank can then be relieved, the other can be loaded correspondingly more. In the following, the removal is given on both flanks by $f_{nF}=2q_F f_n$, with $q_l+q_r=1$ and $f_n=0.5 \cdot (f_{nl}+f_{nr})$. Here, $q_F$ describes the removal distribution on the left flank and on the right flank. The averaged removal $f_n$ is given by:

$$f_n = \left(\sum \eta_{b,Production} - \sum \eta_{b,Measurement}\right) \bigg/ \left(\frac{2q_l}{r_{br} \cdot \cos\beta_{br}} + \frac{2q_r}{r_{bl} \cdot \cos\beta_{bl}}\right)$$

where:

$\Sigma\eta_{b,Production}$:$\Sigma\eta_b$ in accordance with the desired tooth thickness $\Sigma\eta_{b,Measurement}$:$\Sigma\eta_{=b}$ in accordance with the measured tooth thickness $\eta_{bF,Production}$ can then be calculated by:

$$\sum \eta_{bF,Production} = \frac{f_n}{(r_{bF} \cdot \cos\beta_{bF})} + \eta_{bF,Measurement}$$

Here, $\eta_{bF,Measurement}$ describes the previously measured location of the involute and $\eta_{bF,Production}$ the location to be set in the production. These relationships apply to cylindrical and to conical gears. These locations of the involutes in production can be utilized to describe the parameters $\phi_1$, $\phi_2$, $z_{V1}$, $z_{V2}$ for the production process as described above for the location-orientated production.

If this calculation is applied to a symmetrical cylindrical gear in two-flank production, this produces the result which corresponds to the prior art. For this purpose, the location determination is carried out in that only $\phi_1$ or only $\phi_2$ or only $z_{V1}$ or only $z_{V2}$ is varied to contact the left flank and the right flank. If then the symmetries from [EQ_Sym_cyl] and [EQ_Sym_cyl_con] are used to calculate the coordinates for the production, it follows that $$z_{V1,Production}=(z_{V1,Measurement}+z_{Vr1,Measurement})/2$$

or $$z_{V2,Production}=(z_{V2,Measurement}+z_{Vr2,Measurement})/2$$

or $$\phi_{1,Production}=(\phi_{l1,Measurement}+\phi_{r1,Measurement})/2$$

or $$\phi_{2,Production}=(\phi_{l2,Measurement}+\phi_{r2,Measurement})/2$$

depending on which coordinate was varied. The coordinates not varied for the location determination remain unchanged. This reveals how trivial the prior art is and how complex in comparison the method presented here is. In particular no knowledge of coefficients from [EQ_Coeff] and [EQ_Const2] and of the constant from [EQ_Const] is required.

Location Determination/Centering with Narrow Gears and Unfavorable Contact Conditions:

If the left flanks and the right flanks contact on the determination of the position, this is generally done on different gear widths, that is at different z positions. How far apart they are depends both on the geometries of the two wheels 1, 2 and on the relative location of the two wheels with respect to one another. If one of the gears 1, 2 is so narrow that in a location determination, the theoretical distance of the contact points in the z direction on the left flank and on the right flank is larger than the width only due to displacement ($z_{V1}$ or $z_{V2}$) or only due to rotation ($\phi_1$ or $\phi_2$) of one of the two gears, the contacts on the left flank and on the right flank on the narrow gear cannot both take place on the involute. At least one of the contacts takes place on the edge so that a precise centering is no longer possible. In this case, a centering according to the prior art is also no longer possible for cylindrical symmetrical wheels.

This problem can be solved in that not only one of the above-mentioned axes is traveled between the contacts on the left flank and on the right flank, but rather either γ is pivoted or at least two axes are traveled. The first case is only possible in specific cases since the influence of γ on the distance of the contact points on the left flank and on the right flank is limited. Whether this variant is possible can be calculated, for example, using equations [EQ_Cal].

In the second case, at least two of the axes γ, d, $z_{V1}$, $z_{V2}$, $\phi_1$ and $\phi_2$ are traveled for achieving the contact on the left flank and on the right flank so that the contact point respectively still lies on the involute region of the two gears, in particular of the narrow gear. The calculation required for this purpose can be carried out, for example using equations [EQ_Cal].

In both cases, the location of the involute can as previously be determined using [EQ_Rel].

Location-Orientated Production after Dressing a Dressable Tool or after Machining with Another Tool:

A very frequent special case of the location-orientated production is the case in which work is carried out with a tool having a geometry changed with respect to the original location determination. This occurs e.g. when work is carried out with dressable tools which become smaller and smaller from dressing process to dressing process and so change their geometry. If the dressing process takes place in the machine, the exact geometry and also location of the tool is known as a rule due to this process. Alternatively, the location of the tool can also be determined metrologically or by the mounting on the spindle, for example using a groove. This second variant can be used, for example, when the tool is externally dressed or when it is, for example, an externally post-ground or post-sharpened tool, e.g. a hob or a skiving wheel.

The method described in this present disclosure for determining the location of the involutes of a workpiece is not always carried out for every workpiece of one type prior to machining. It is typically carried out once or a few times for a workpiece of one type, in particular in mass production. An insertion sensor is then taught with the result of this location determination. Such insertion sensors can generally not determine the absolute location of the workpiece, but rather only the location relative to a reference location, which makes such a teaching necessary. For this purpose, a workpiece whose location was exactly determined is measured using an insertion sensor and the current location is stored as the reference location. It is then possible with the aid of an insertion sensor taught in this way to bring all further workpieces into the same location or to determine their location relative to the reference location and thus also absolutely. If the location of the workpiece and the location of the tool are known in this manner, machining can take place with the current tool, as described above, with stock-removal optimization or with optimization according to a different process or with location orientation. In this respect, the current tool can have any geometry which is suitable for the production of the workpiece. The tool can in particular also be changed in the angles of engagement and/or in the helical angle and/or in the helices/tooth number and/or in the tooth thickness and/or optionally in the cone angle with respect to the tool which was used to teach the insertion sensor. All crossed-axes angles and all axial distances can furthermore be set which are suitable for the production of the workpiece. This process is necessary to be able to center precisely over the whole service life of the tool. Even with tools which are changed only in the diameter, but not in the angles of engagement and/or in the helical angle and/or optionally in the cone angle, this process produces a more precise centering in comparison with the prior art in which use is not made of this exact calculation, but an attempt is only made to hold the worm spirals at the same position at the worm during dressing.

The determination of the position of the workpiece in the teaching of the insertion sensor does not necessarily have to take place with the tool. Alternatively, for example, a measurement probe or another measuring device can be used here.

The insertion using an insertion sensor is also only one possibility of determining the location of the workpiece before the machining. Alternatively, for example, a location determination is also possible with a measurement probe or another measuring device.

Position-Orientated Production of More than One Gear in a Clamping:

It is sensible in specific cases to produce more than one gear of a workpiece in a clamping. This can be done for each gear using different tools which can be mounted on the same spindle or on different spindles. In certain cases, it is, however, also possible to produce more than one gear using one tool. If the gears are to be produced with location-orientation, that is if one gear is to be orientated on one of the others, as is the case, for example, with real and pseudo-double helical gears, the formalism described here can likewise be used, irrespective of whether production takes place with the same tool or with different tools. The procedure as follows is followed for this purpose, for example:

The first gear is produced using the method described here with a defined location with respect to a reference direction. If such a reference direction is not present, production takes place with respect to any desired direction and the location of the gear is determined using the formalism described here from the location of the tool during the production. If machining is carried out on one flank, the coordinates $\gamma$, d, $z_{V1}$, $z_{V2}$, $\phi_1$ and $\phi_2$ can be recorded for any desired time during the machining of a flank and its location can be determined therefrom. For the other flank, if necessary, either an analog process is followed or its position is calculated from the tooth thickness to which production is carried out. If machining is carried out on two flanks, the coordinates $\gamma$, d, $z_{V1}$, $z_{V2}$, $\phi_1$ and $\phi_2$ can be recorded for both flanks or only for one flank for the same point in time or for different points in time of the machining and the locations or location of the two involutes or of the involute can thus be determined. Alternatively, only the position of one involute can also be determined here and the second, if necessary, via the tooth thickness.

The location of the second gear is calculated from the location of the first gear in accordance with the definition.

In accordance with the thus determined desired position of the second gear, the kinematics for its production is calculated using the same tool or another tool. If production is carried out using a different tool, its location must be known. This can be determined metrologically, for example, or it can be known from the production in the machine (dressing). Alternatively, it can be determined by a groove in the tool mount.

Further gears are produced analogously as required.

Finally, the possible applications of the method in accordance with the present disclosure can be summarized as follows:

Determining the location ($\eta_{bl1}$ and $\eta_{br1}$) of the left involute and the right involute using the tool, with the two gears not having to mesh, but being able to mesh with one another. For this purpose, the exact location of the involutes ($\eta_{bl2}$ and $\eta_{br2}$) of the tool must be known. It can be known by:

A correspondingly produced and mounted tool;
From the dressing process in the machine;
By measuring using a measurement system; and
By measuring using a master wheel as described below.

The gears can be of the involute type 1-4. Both the tool and the workpiece can have known modifications/profile differences/profile errors. With tools having a defined edge, this can take place in the non-running state if the position of the lands is known.

Determining the location ($\eta_{bl2}$ and $n_{br2}$) of the left involute and of the right involute of the tool at a measured gear (master wheel). Its location can have previously been determined using a different measurement system in the machine.

Determining the tooth thickness of a tool at a gear (master wheel). This can have previously been measured in an external measuring machine. This can be used, for example, to determine the state with a sharpened tool (hob, skiver).

Checking a Tool for Profile Defects at a Master Wheel

Aligning the involutes of the workpiece on the production at a reference direction. This can have been determined inter alia by:

Measuring at a groove, bore, pre-gear cut gear (possibly with tolerance allowance), another gear, using a measurement probe or similar;
Determining the location using a tool in the pre-gear cut gear (possible with allowance analysis), in a different gear, with these not necessarily having to mesh with one another, at a different, non-gear cut (non-involute) part of the workpiece.

Centering the tool for the post-gear cutting machining. Centering is a combination of location determination and orientation of the involutes.

Centering the tool with a modified tool geometry and/or modified manufacturing kinematics.

Figure 9:
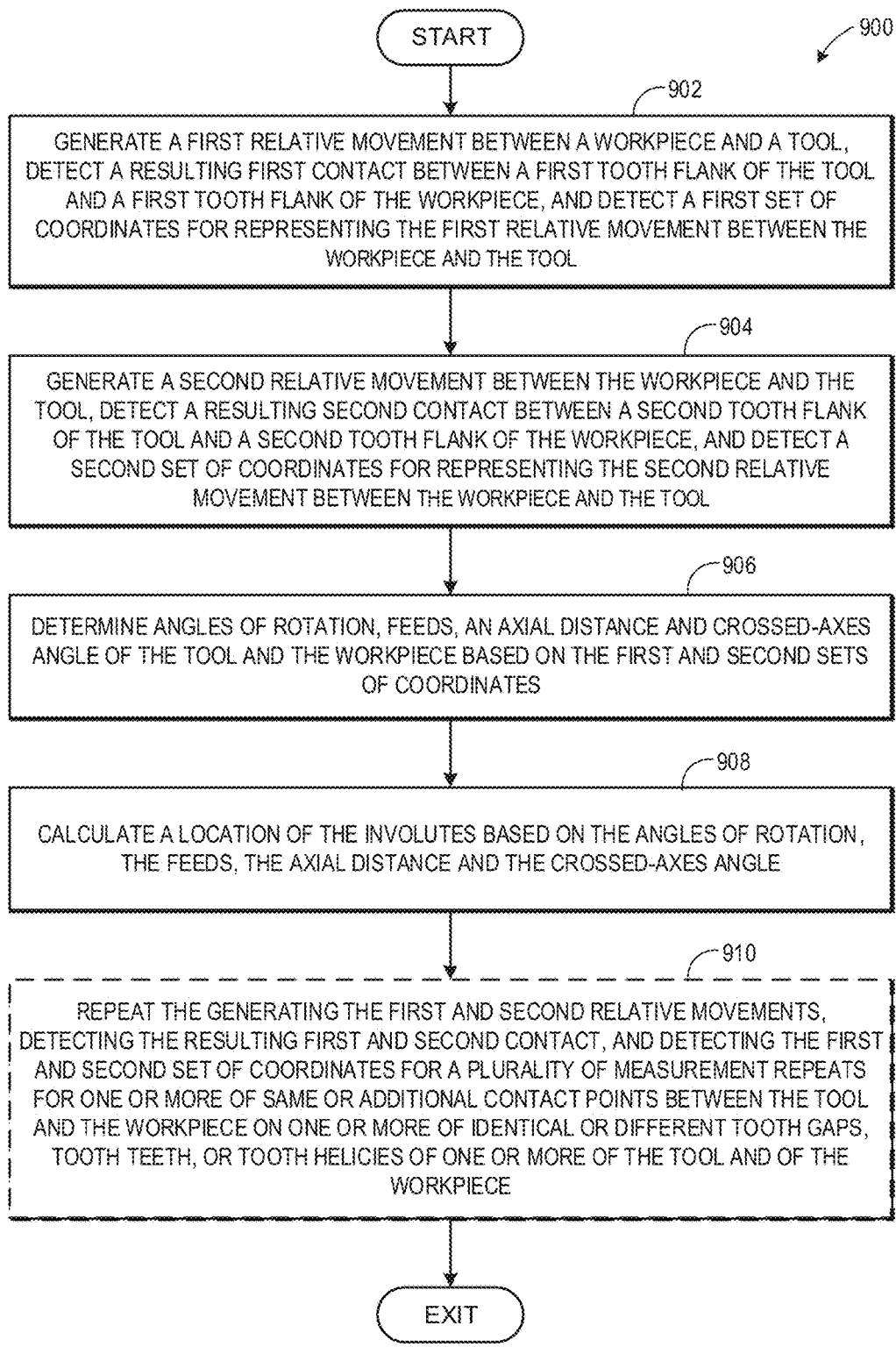
FIG. 9 shows a method for location determination of involutes of a pre-gear cut workpiece within a gear-cutting machine using a gear-cut tool.

FIG. 9 shows a first method 900 for location determination of involutes of a pre-gear cut workpiece within a gear-cutting machine using a gear-cut tool. As one example, method 900 may be executed by a controller (such as controller 12 shown in FIG. 8) using a gear-cutting machine (such as the gear-cutting machine 800 shown in FIG. 8) according to instructions stored in a memory of the controller. As such, based on data and information received at the controller from various machine sensors and actuator movements (as described herein and further below), the controller may determine a location of involutes of a workpiece. Method 900 may employ the various methods and strategies discussed above with reference to determining an involute location of a workpiece.

Method 900 begins at 902 by generating a first relative movement between a workpiece and a tool, detecting a resulting first contact between a first tooth flank of the tool and a first tooth flank of the workpiece, and detecting a first set of coordinates for representing the first relative movement between the workpiece and the tool.

At 904 the method includes generating a second relative movement between the workpiece and the tool, detecting a resulting second contact between a second tooth flank of the tool and a second tooth flank of the workpiece, and detecting a second set of coordinates for representing the second relative movement between the workpiece and the tool.

At 906 the method includes determining angles of rotation, feeds, an axial distance and crossed-axes angle of the tool and the workpiece based on the first and second sets of coordinates. As one example, the angles of rotation, the feeds, the axial distance and the crossed-axes angle are determined by equating a kinematic chain which describes a relative location between the workpiece and the tool (such as one of the kinematic chains described above) with a transformation from the detected first set and second set of coordinates.

At 908 the method includes calculating a location of the involutes based on the angles of rotation, the feeds, the axial distance and the crossed-axes angle. As one example, calculating the location of the involutes at 908 includes calculating a relative location of an involute of the first and second tooth flanks of the workpiece with respect to one another, where the first and second tooth flanks of the workpiece are left and right tooth flanks of the workpiece. For example, the sum of the left and right base gap half-angles is calculated which represents the tooth thickness of a workpiece tooth. As another example, the method at 908 may include calculating an absolute location of a center of a tooth or of a gap of the workpiece. For example, this may include calculating the difference of the base gap half angle of the left and right flanks of the workpiece. As yet another example, the method at 908 may include calculating an absolute position of a first and second involute of a workpiece tooth, where the first involute is a first involute of the first tooth flank and the second involute is a second involute of the second tooth flank, where the first tooth flank is a left tooth flank of the workpiece and the second tooth flank is a right tooth flank of the workpiece. For texample, this may include calculating the base gap half-angle for the left and/or right flank(s) of the workpiece. As another example, calculating the location of the involutes at 908 is further based on one or more of modifications of one or more of first and second involutes of the workpiece, where the first and second involutes are left and right involutes of the workpiece, and modifactions of the tool.

As one example, one or more of the workpiece and/or the tool has an asymmetrical cylindrical or conical gear, where the workpiece and the tool form a helical rolling type gear transmission. Further, method 900 can be carried out independently of whether the workpiece and the tool mesh with one another. Method 900 may further comprise centering the tool for the gear-cutting machine based on the location of the involutes (e.g., based the calculated location of the involutes at 908).

Method 900 may optionally include, at 910, repeating the generating the first and second relative movements, detecting the resulting first and second contact, and detecting the first and second set of coordinates for a plurality of measurement repeats for one or more of same or additional contact points between the tool and the workpiece on one or more of identical or different tooth gaps, tooth teeth, or tooth helicies of one or more of the tool and of the workpiece. For example, the methods at 902-904 may be repeated for the same or additional contact points between the workpiece and tool. The method at 910 may further include statistically evaluating the plurality of measurement repeats (e.g., evaluating the repeated or additional measurements) for reducing measuring inaccuracies. The method at 910 may further include one or more of performing an allowance analysis, a profile/flank measurement, a pitch measurement, and/or a tooth thickness measurement on the plurality of measurement repeats (e.g., on the additional or repeated measurements). As one example, the method may further include centering the tool based on a preceding allowance analysis of the tool such that a stock removal is identical or almost identical in a normal direction on left and right flanks of the workpiece or a removal distribution is directly set.

In one example, when the tool has a defined edge, movement axes of one or more of the tool and the workpiece, such as the angle of rotation and/or the feed of the tool and/or of the workpiece, are aligned in advance based on a location of one or more lands of the tool so that the contact point lie between the workpiece and the tool in a region of a defined edge (e.g., on the envelope gear). As another example, the method may include moving between the first contact (at 902) and the second contact (at 904) via one or more of traveling at least two axes of the tool and/or of the workpiece, where the at least two axes are a feed and angle of rotation of the workpiece and/or of the tool, and adjusting only the crossed-axes angle, where adjusting only the crossed-axes angled includes adjusting a pivot movement of the tool and/or of the workpiece.

In another embodiment, method 900 may employ an insertion sensor of the gear-cutting machine to determine the location of the involute of the workpiece. For example, the method may include measuring the location of the involutes via the insertion sensor (e.g., an insertion sensor for a mass production of a workpiece) and then storing with reference to a reference location using the insertion sensor the location of the involutes in a memory of the controller of the gear-cutting machine, where subsequent workpieces are able to be brought into the same location using the insertion sensor.

Figure 10:
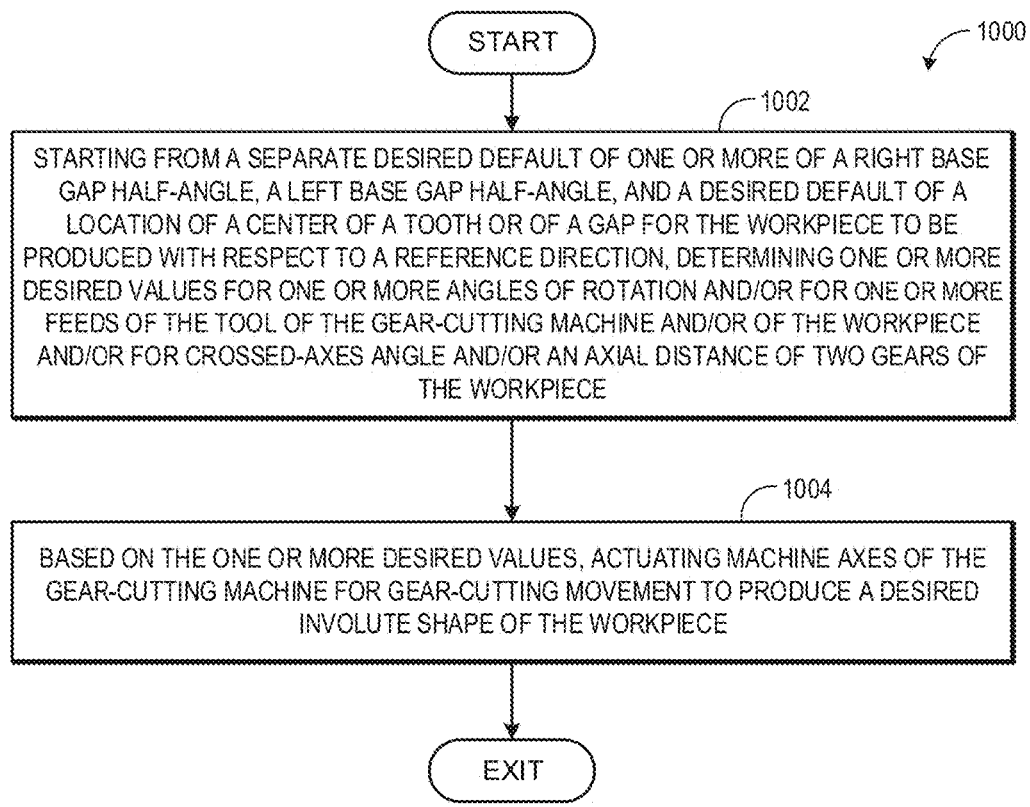
FIG. 10 shows a method for the location-orientated production of a workpiece on a gear-cutting machine.

FIG. 10 shows a first method 1000 for the location-orientated production of a workpiece on a gear-cutting machine. As one example, method 1000 may be executed by a controller (such as controller 12 shown in FIG. 8) using a gear-cutting machine (such as the gear-cutting machine 800 shown in FIG. 8) according to instructions stored in a memory of the controller. As such, based on data and information received at the controller from various machine sensors and actuator movements (as described herein and further below), the controller may determining one or more values of angles of rotation and/or feeds of a tool of the gear-cutting machine and/or workpiece and/or cross-azes angle and/or an axial distance of two gears of the workpiece. Method 1000 may employ the various methods and strategies discussed above with reference to producing a workpiece on gear-cutting machine.

Method 1000 starts at 1002. The method at 1002 includes, starting from a separate desired default of one or more of a right base gap half-angle, a left base gap half-angle, and a desired default of a location of a center of a tooth or of a gap for the workpiece to be produced with respect to a reference direction, determining one or more desired values for one or more angles of rotation and/or for one or more feeds of the tool of the gear-cutting machine and/or of the workpiece and/or for crossed-axes angle and/or an axial distance of two gears of the workpiece. In this way, the method at 1002 may include determining one or more values for the workpiece and/tool needed to produce the workpiece using the gear-cutting machine. As one example, the determining of the one or more desired values takes place by a reversal of the calculation steps of the method 900, as described above. At 1004, the method further includes, based on the one or more desired values determined at 1002, actuating machine axes of the gear-cutting machine for gear-cutting movement to produce a desired involute shape of the workpiece. In this way, a workpiece with the desired involutes may be produced. As one example, the method at 1004 may include producing at least two gears of the workpiece with location orientation with respect to one another during a workpiece clamping, where the actuating includes first actuating the machine axes to produce a first gear of the at least two gears having a predefined reference direction and then repeating the acutating the machine axes to produce a second gear of the at least two gears, with a location of the second gear being calculated from a location of the first gear.

The control methods and routines disclosed herein may be stored as executable instructions in non-transitory memory of the controller and carried out by the controller in combination with the various structural system elements, such as actuators, sensors, etc. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in a control system carried out in combination with the described elements of the structural system.

It will be appreciated that the configurations and routines disclosed herein are exemplary in nature, and that these specific embodiments are not to be considered in a limiting sense, because numerous variations are possible.

The invention claimed is:

1. A method for location determination of involutes of a pre-gear cut workpiece within a gear-cutting machine using a gear-cut tool comprising the following method steps:
   generating a first relative movement between a workpiece and a tool, detecting a resulting first contact between a first tooth flank of the tool and a first tooth flank of the workpiece, and detecting a first set of coordinates for representing the first relative movement between the workpiece and the tool;
   generating a second relative movement between the workpiece and the tool, detecting a resulting second contact between a second tooth flank of the tool and a second tooth flank of the workpiece, and detecting a second set of coordinates for representing the second relative movement between the workpiece and the tool; and
   determining angles of rotation, feeds, an axial distance, and a crossed-axes angle of the tool and the workpiece based on the first and second sets of coordinates and calculating a location of the involutes based on the angles of rotation, the feeds, the axial distance, and the crossed-axes angle.

2. The method in accordance with claim 1, wherein the angles of rotation, the feeds, the axial distance, and the crossed-axes angle are determined by equating a kinematic chain which describes a relative location between the workpiece and the tool with a transformation from the detected first and second sets of coordinates.

3. The method in accordance with claim 1, wherein calculating the location of the involutes includes calculating a relative location of an involute of the first and second tooth flanks of the workpiece with respect to one another, where the first and second tooth flanks of the workpiece are left and right tooth flanks of the workpiece.

4. The method in accordance with claim 1, further comprising calculating an absolute location of a center of a tooth or of a gap of the workpiece.

5. The method in accordance with claim 1, further comprising calculating an absolute position of a first and second involute of a workpiece tooth, where the first involute is a first involute of the first tooth flank and the second involute is a second involute of the second tooth flank, where the first tooth flank is a left tooth flank of the workpiece and the second tooth flank is a right tooth flank of the workpiece.

6. The method in accordance with claim 1, wherein calculating the location of the involutes is further based on one or more of modifications of one or more of first and second involutes of the workpiece, where the first and second involutes are left and right involutes of the workpiece, and modifications of the tool.

7. The method in accordance with claim 1, wherein one or more of the workpiece and the tool has an asymmetrical cylindrical or conical gear, wherein the workpiece and the tool form a helical rolling type gear transmission.

8. The method in accordance with claim 1, further comprising centering the tool for the gear-cutting machine based on the location of the involutes.

9. The method in accordance with claim 1, further comprising:
   repeating the generating the first and second relative movements, detecting the resulting first and second contacts, and detecting the first and second sets of coordinates for a plurality of measurement repeats for one or more of same or additional contact points between the tool and the workpiece on one or more of identical or different tooth gaps, tooth teeth, or tooth helicies of one or more of the tool and of the workpiece, and
   one or more of statistically evaluating the plurality of measurement repeats for reducing measuring inaccuracies, performing an allowance analysis on the plurality of measurement repeats, performing a profile/flank measurement on the plurality of measurement repeats, performing a pitch measurement on the plurality of measurement repeats, and performing a tooth thickness measurement on the plurality of measurement repeats.

10. The method in accordance with claim 9, further comprising centering the tool based on a preceding allowance analysis of the tool such that a stock removal is identical or almost identical in a normal direction on left and right flanks of the workpiece or a removal distribution is directly set.

11. The method in accordance with claim 1, wherein the method can be carried out in an analog manner for one or more of the location determination of the involutes and a tooth thickness determination of the gear-cut tool.

12. The method in accordance with claim 1, wherein when the tool has a defined edge, movement axes of one or more of the tool and the workpiece are aligned in advance based on a location of one or more lands of the tool so that the contact point lies between the workpiece and the tool in a region of the defined edge.

13. The method in accordance with claim 1, further comprising moving between the first contact and the second contact via one or more of traveling at least two axes of the tool and/or of the workpiece, where the at least two axes are a feed and an angle of rotation of the workpiece and/or of the tool, and adjusting only the crossed-axes angle, where adjusting only the crossed-axes angle includes adjusting a pivot movement of the tool and/or of the workpiece.

14. The method in accordance with claim 1, further comprising measuring the location of the involutes via an insertion sensor for a mass production of a workpiece and storing with reference to a reference location using the insertion sensor the location of the involutes in a memory of a controller of the gear-cutting machine, where subsequent workpieces are able to be brought into the same location using the insertion sensor.

15. The method in accordance with claim 1, wherein for one or more of the first and second relative movements, exactly one physical axle of the gear-cutting machine is traveled provided that the traveling of the exactly one physical axle not only effects a change of either exactly one feed or of exactly one angle of rotation of exactly one of two gear wheels.

* * * * *